(12) United States Patent
Rooyakkers et al.

(10) Patent No.: US 11,966,349 B2
(45) Date of Patent: *Apr. 23, 2024

(54) ELECTROMAGNETIC CONNECTOR FOR FOR AN INDUSTRIAL CONTROL SYSTEM

(71) Applicant: Analog Devices, Inc., Wilmington, MA (US)

(72) Inventors: Albert Rooyakkers, Sunnyvale, CA (US); James G. Calvin, Attleboro, MA (US)

(73) Assignee: Analog Devices, Inc., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/312,360

(22) Filed: May 4, 2023

(65) Prior Publication Data
US 2023/0360851 A1 Nov. 9, 2023

Related U.S. Application Data

(63) Continuation of application No. 17/094,351, filed on Nov. 10, 2020, now Pat. No. 11,688,549, which is a (Continued)

(51) Int. Cl.
*H01F 38/14* (2006.01)
*G06F 13/20* (2006.01)
(Continued)

(52) U.S. Cl.
CPC .......... *G06F 13/4022* (2013.01); *G06F 13/20* (2013.01); *G06F 13/364* (2013.01);
(Continued)

(58) Field of Classification Search
CPC ..... H02J 5/005; H04B 5/0037; H04B 5/0075; H04B 5/0087; H04B 5/0093; H01F 38/14; H01F 5/003; H01F 5/005; H01F 5/04
See application file for complete search history.

(56) References Cited

U.S. PATENT DOCUMENTS 1,778,549 A 10/1930 Conner
1,961,013 A 5/1934 Battista et al.
(Continued)

FOREIGN PATENT DOCUMENTS

CN 2162746 Y 4/1994
CN 1408129 A 4/2003
(Continued)

OTHER PUBLICATIONS

Baran, M. et al., "Overcurrent Protection on Voltage-Source-Converter-Based Multiterminal DC Distribution Systems," IEEE Transactions on Power Delivery, vol. 22, No. 1, Jan. 2007, pp. 406-412.
(Continued)

*Primary Examiner* — Kyle J Moody
*Assistant Examiner* — Jye-June Lee
(74) *Attorney, Agent, or Firm* — Kevin E. West; Advent, LLP

(57) ABSTRACT

An electromagnetic connector is disclosed that is configured to form a first magnetic circuit portion comprising a first core member and a first coil disposed of the first core member. The electromagnetic connector is configured to mate with a second electromagnetic connector, where the second electromagnetic connector is configured to form a second magnetic circuit portion comprising a second core member and a second coil disposed of the second core member. The first core member and the second core member are configured to couple the first coil to the second coil with a magnetic circuit formed from the first magnetic circuit portion and the second magnetic circuit portion when the electromagnetic connector is mated with the second electromagnetic connector. The magnetic circuit is configured to induce a signal in the first coil when the second coil is energized.

20 Claims, 16 Drawing Sheets

Related U.S. Application Data continuation of application No. 15/830,587, filed on Dec. 4, 2017, now Pat. No. 10,832,861, which is a continuation of application No. 14/597,498, filed on Jan. 15, 2015, now Pat. No. 9,837,205, which is a continuation of application No. 13/341,143, filed on Dec. 30, 2011, now Pat. No. 8,971,072.

(51) Int. Cl.

| | | |
|---|---|---|
| *G06F 13/364* | (2006.01) | |
| *G06F 13/40* | (2006.01) | |
| *G06F 13/42* | (2006.01) | |
| *G06F 15/16* | (2006.01) | |
| *G06F 15/173* | (2006.01) | |
| *H01F 3/14* | (2006.01) | |
| *H01F 5/00* | (2006.01) | |
| *H01F 5/04* | (2006.01) | |
| *H01F 7/20* | (2006.01) | |
| *H04B 3/54* | (2006.01) | |
| *H01F 7/06* | (2006.01) | |
| *H01F 27/06* | (2006.01) | |

(52) U.S. Cl.
CPC ......... *G06F 13/4282* (2013.01); *G06F 15/16* (2013.01); *G06F 15/17312* (2013.01); *H01F 3/14* (2013.01); *H01F 5/003* (2013.01); *H01F 5/04* (2013.01); *H01F 7/20* (2013.01); *H01F 38/14* (2013.01); *H04B 3/548* (2013.01); *G06F 2213/0004* (2013.01); *G06F 2213/0022* (2013.01); *G06F 2213/0024* (2013.01); *H01F 2007/062* (2013.01); *H01F 27/06* (2013.01); *H04B 2203/5454* (2013.01); *H04B 2203/5483* (2013.01)

(56) References Cited

U.S. PATENT DOCUMENTS

| | | |
|---|---|---|
| 2,540,575 A | 2/1951 | Tomun et al. |
| 3,702,983 A | 11/1972 | Chace et al. |
| 4,079,440 A | 3/1978 | Ohnuma et al. |
| 4,082,984 A | 4/1978 | Iwata |
| 4,337,499 A | 6/1982 | Cronin et al. |
| 4,403,286 A | 9/1983 | Fry et al. |
| 4,508,414 A | 4/1985 | Kusui et al. |
| 4,628,308 A | 12/1986 | Robert |
| 4,656,622 A | 4/1987 | Lea |
| 4,672,529 A | 6/1987 | Kupersmit |
| 4,679,193 A | 7/1987 | Jensen et al. |
| 4,691,384 A | 9/1987 | Jobe |
| 4,789,792 A | 12/1988 | Ruedi |
| 4,882,702 A | 11/1989 | Struger et al. |
| 4,929,939 A | 5/1990 | Varma et al. |
| 4,932,892 A | 6/1990 | Hatch |
| 5,013,247 A | 5/1991 | Watson |
| 5,128,664 A | 7/1992 | Bishop |
| 5,229,652 A | 7/1993 | Hough |
| 5,325,046 A | 6/1994 | Young et al. |
| 5,378,166 A | 1/1995 | Gallagher, Sr. |
| 5,385,487 A | 1/1995 | Beitman |
| 5,385,490 A | 1/1995 | Demeter et al. |
| 5,388,099 A | 2/1995 | Poole |
| 5,422,558 A | 6/1995 | Stewart |
| 5,469,334 A | 11/1995 | Balakrishnan |
| 5,519,583 A | 5/1996 | Kolling et al. |
| 5,546,463 A | 8/1996 | Caputo et al. |
| 5,572,511 A | 11/1996 | Ouyang et al. |
| 5,590,284 A | 12/1996 | Crosetto |
| 5,602,754 A | 2/1997 | Beatty et al. |
| 5,603,044 A | 2/1997 | Annapareddy et al. |
| 5,719,483 A | 2/1998 | Abbott et al. |
| 5,724,349 A | 3/1998 | Cloonan et al. |
| 5,735,707 A | 4/1998 | O'Groske et al. |
| 5,757,795 A | 5/1998 | Schnell |
| 5,773,962 A | 6/1998 | Nor |
| 5,860,824 A | 1/1999 | Fan |
| 5,896,473 A | 4/1999 | Kaspari |
| 5,909,368 A | 6/1999 | Nixon et al. |
| 5,951,666 A | 9/1999 | Ilting et al. |
| 5,958,030 A | 9/1999 | Kwa |
| 5,963,448 A | 10/1999 | Flood et al. |
| 5,980,312 A | 11/1999 | Chapman et al. |
| 6,002,675 A | 12/1999 | Ben-Michael et al. |
| 6,009,410 A | 12/1999 | Lemole et al. |
| 6,016,310 A | 1/2000 | Muller et al. |
| 6,046,513 A | 4/2000 | Jouper et al. |
| 6,104,913 A | 8/2000 | McAllister |
| 6,124,778 A | 9/2000 | Rowley et al. |
| 6,178,474 B1 | 1/2001 | Hamano et al. |
| 6,218,740 B1 | 4/2001 | Mildice |
| 6,219,789 B1 | 4/2001 | Little et al. |
| 6,220,889 B1 | 4/2001 | Ely et al. |
| 6,347,963 B1 | 2/2002 | Falkenberg et al. |
| 6,393,565 B1 | 5/2002 | Lockhart et al. |
| 6,435,409 B1 | 8/2002 | Hu |
| 6,453,416 B1 | 9/2002 | Epstein |
| 6,480,963 B1 | 11/2002 | Tachibana et al. |
| 6,490,176 B2 * | 12/2002 | Holzer .................. H02J 50/12 363/20 |
| 6,574,681 B1 | 6/2003 | White et al. |
| 6,597,683 B1 | 7/2003 | Gehring et al. |
| 6,643,777 B1 | 11/2003 | Chu |
| 6,680,904 B1 | 1/2004 | Kaplan et al. |
| 6,695,620 B1 | 2/2004 | Huang |
| 6,714,541 B1 | 3/2004 | Iyer et al. |
| 6,799,234 B1 | 9/2004 | Moon et al. |
| 6,812,803 B2 | 11/2004 | Goergen |
| 6,814,580 B2 | 11/2004 | Li et al. |
| 6,828,894 B1 | 12/2004 | Sorger et al. |
| 6,840,795 B1 | 1/2005 | Takeda et al. |
| 6,956,355 B2 | 10/2005 | Vaillancourt et al. |
| 6,988,162 B2 | 1/2006 | Goergen |
| 6,991,467 B1 | 1/2006 | Cheng et al. |
| 7,114,070 B1 | 9/2006 | Willming et al. |
| 7,164,255 B2 | 1/2007 | Hui |
| 7,172,428 B2 | 2/2007 | Huang |
| 7,200,692 B2 | 4/2007 | Singla et al. |
| 7,234,963 B1 | 6/2007 | Huang |
| 7,254,452 B2 | 8/2007 | Davlin et al. |
| 7,399,209 B2 | 7/2008 | Kodaira |
| 7,402,074 B2 | 7/2008 | Leblanc et al. |
| 7,415,368 B2 | 8/2008 | Gilbert et al. |
| 7,426,585 B1 | 9/2008 | Rourke |
| 7,460,482 B2 | 12/2008 | Pike |
| 7,510,420 B2 | 3/2009 | Mori |
| 7,526,676 B2 | 4/2009 | Chou et al. |
| 7,529,862 B2 | 5/2009 | Isani et al. |
| 7,536,548 B1 | 5/2009 | Batke et al. |
| 7,554,288 B2 | 6/2009 | Gangstoe et al. |
| 7,587,481 B1 | 9/2009 | Osburn, III |
| 7,614,909 B2 | 11/2009 | Lin |
| 7,619,386 B2 | 11/2009 | Sasaki et al. |
| 7,622,994 B2 | 11/2009 | Galal |
| 7,660,998 B2 | 2/2010 | Walmsley |
| 7,670,190 B2 | 3/2010 | Shi et al. |
| 7,685,349 B2 | 3/2010 | Allen et al. |
| 7,730,304 B2 | 6/2010 | Katsube et al. |
| 7,746,846 B2 | 6/2010 | Boora et al. |
| 7,761,640 B2 | 7/2010 | Hikabe |
| 7,774,074 B2 | 8/2010 | Davlin et al. |
| 7,788,431 B2 | 8/2010 | Deshpande et al. |
| 7,790,304 B2 | 9/2010 | Hendricks et al. |
| 7,811,136 B1 | 10/2010 | Hsieh et al. |
| 7,815,471 B2 | 10/2010 | Wu |
| 7,822,994 B2 | 10/2010 | Hamaguchi |
| 7,839,025 B2 | 11/2010 | Besser et al. |
| 7,872,561 B2 | 1/2011 | Matumoto |
| 7,948,758 B2 | 5/2011 | Buhler et al. |
| 7,960,870 B2 | 6/2011 | Besser et al. |
| 7,971,052 B2 | 6/2011 | Lucas et al. |
| 8,013,474 B2 | 9/2011 | Besser et al. |

(56) References Cited

U.S. PATENT DOCUMENTS

| | | |
|---|---|---|
| 8,019,194 B2 | 9/2011 | Morrison et al. |
| 8,032,745 B2 | 10/2011 | Bandholz et al. |
| 8,062,070 B2 | 11/2011 | Jeon et al. |
| 8,125,208 B2 * | 2/2012 | Gyland ............ H02M 3/33571 |
| | | 363/16 |
| 8,132,231 B2 | 3/2012 | Amies et al. |
| 8,143,858 B2 | 3/2012 | Tsugawa et al. |
| 8,149,587 B2 | 4/2012 | Baran et al. |
| 8,157,569 B1 | 4/2012 | Liu |
| 8,181,262 B2 | 5/2012 | Cooper et al. |
| 8,189,101 B2 | 5/2012 | Cummings et al. |
| 8,212,399 B2 | 7/2012 | Besser et al. |
| 8,266,360 B2 | 9/2012 | Agrawal |
| 8,281,386 B2 | 10/2012 | Milligan et al. |
| 8,287,306 B2 | 10/2012 | Daugherty et al. |
| 8,295,770 B2 | 10/2012 | Seil et al. |
| 8,310,380 B2 | 11/2012 | Aria et al. |
| 8,341,717 B1 | 12/2012 | Delker et al. |
| 8,380,905 B2 | 2/2013 | Djabbari et al. |
| 8,390,441 B2 | 3/2013 | Covaro et al. |
| 8,465,762 B2 | 6/2013 | Lee et al. |
| 8,480,438 B2 | 7/2013 | Mattson |
| 8,532,119 B2 | 9/2013 | Snively et al. |
| 8,560,147 B2 | 10/2013 | Taylor et al. |
| 8,587,318 B2 | 11/2013 | Chandler et al. |
| 8,651,874 B2 | 2/2014 | Ku et al. |
| 8,677,145 B2 | 3/2014 | Maletsky et al. |
| 8,694,770 B1 | 4/2014 | Osburn, III |
| 8,777,671 B2 | 7/2014 | Huang |
| 8,862,802 B2 | 10/2014 | Calvin et al. |
| 8,868,813 B2 | 10/2014 | Calvin et al. |
| 8,971,072 B2 | 3/2015 | Calvin et al. |
| 9,071,082 B2 | 6/2015 | Nishibayashi et al. |
| 9,318,917 B2 | 4/2016 | Kubota et al. |
| 9,436,641 B2 | 9/2016 | Calvin et al. |
| 9,465,762 B2 | 10/2016 | Calvin et al. |
| 9,467,297 B2 | 10/2016 | Clish et al. |
| 9,812,803 B2 | 11/2017 | Toyoda et al. |
| 9,843,149 B1 | 12/2017 | Irbe et al. |
| 10,103,875 B1 | 10/2018 | Roth et al. |
| 10,613,567 B2 | 4/2020 | Rooyakkers et al. |
| 10,832,861 B2 | 11/2020 | Rooyakkers et al. |
| 11,046,260 B2 | 6/2021 | Sekino et al. |
| 11,093,427 B2 | 8/2021 | Calvin et al. |
| 2002/0070835 A1 * | 6/2002 | Dadafshar ........... H01F 27/2804 |
| | | 336/200 |
| 2002/0080828 A1 | 6/2002 | Ofek et al. |
| 2002/0080829 A1 | 6/2002 | Ofek et al. |
| 2002/0084698 A1 | 7/2002 | Kelly et al. |
| 2002/0086678 A1 | 7/2002 | Salokannel et al. |
| 2002/0095573 A1 | 7/2002 | O'Brien |
| 2002/0097031 A1 | 7/2002 | Cook et al. |
| 2002/0116619 A1 | 8/2002 | Maruyama et al. |
| 2002/0124198 A1 | 9/2002 | Bormann et al. |
| 2002/0171525 A1 | 11/2002 | Kobayashi et al. |
| 2002/0182898 A1 | 12/2002 | Takahashi et al. |
| 2002/0189910 A1 | 12/2002 | Yano et al. |
| 2003/0005289 A1 | 1/2003 | Gougeon et al. |
| 2003/0013727 A1 | 1/2003 | Maw et al. |
| 2003/0040897 A1 | 2/2003 | Murphy et al. |
| 2003/0074489 A1 | 4/2003 | Steger et al. |
| 2003/0094855 A1 | 5/2003 | Lohr et al. |
| 2003/0105601 A1 | 6/2003 | Kobayashi et al. |
| 2003/0137277 A1 | 7/2003 | Mori et al. |
| 2003/0166397 A1 | 9/2003 | Aura |
| 2003/0202330 A1 | 10/2003 | Lopata et al. |
| 2003/0204756 A1 | 10/2003 | Ransom et al. |
| 2003/0236998 A1 | 12/2003 | Gilstrap et al. |
| 2004/0178770 A1 | 9/2004 | Gagnon et al. |
| 2005/0001589 A1 | 1/2005 | Edington et al. |
| 2005/0019143 A1 | 1/2005 | Bishman |
| 2005/0091432 A1 | 4/2005 | Adams et al. |
| 2005/0102535 A1 | 5/2005 | Patrick et al. |
| 2005/0144437 A1 | 6/2005 | Ransom et al. |
| 2005/0144440 A1 | 6/2005 | Catherman et al. |
| 2005/0151720 A1 | 7/2005 | Cruz-Hernandez et al. |
| 2005/0162019 A1 | 7/2005 | Masciarelli et al. |
| 2005/0182876 A1 | 8/2005 | Kim et al. |
| 2005/0189910 A1 | 9/2005 | Hui |
| 2005/0198522 A1 | 9/2005 | Shaw et al. |
| 2005/0229004 A1 | 10/2005 | Callaghan |
| 2006/0015590 A1 | 1/2006 | Patil et al. |
| 2006/0020782 A1 | 1/2006 | Kakii |
| 2006/0108972 A1 | 5/2006 | Araya |
| 2006/0119315 A1 | 6/2006 | Sasaki et al. |
| 2006/0155990 A1 | 7/2006 | Katsube et al. |
| 2006/0156415 A1 | 7/2006 | Rubinstein et al. |
| 2007/0072442 A1 | 3/2007 | Difonzo et al. |
| 2007/0076768 A1 | 4/2007 | Chiesa et al. |
| 2007/0091886 A1 | 4/2007 | Davis et al. |
| 2007/0123304 A1 | 5/2007 | Pattenden et al. |
| 2007/0123316 A1 | 5/2007 | Little |
| 2007/0143838 A1 | 6/2007 | Milligan et al. |
| 2007/0174524 A1 | 7/2007 | Kato et al. |
| 2007/0177298 A1 | 8/2007 | Jaatinen et al. |
| 2007/0192134 A1 | 8/2007 | Littenberg et al. |
| 2007/0194944 A1 | 8/2007 | Galera et al. |
| 2007/0214296 A1 | 9/2007 | Takamatsu et al. |
| 2007/0229302 A1 | 10/2007 | Penick et al. |
| 2007/0260897 A1 | 11/2007 | Cochran et al. |
| 2007/0286234 A1 | 12/2007 | Gutman et al. |
| 2008/0067874 A1 * | 3/2008 | Tseng ................... H02J 50/12 |
| | | 336/200 |
| 2008/0077976 A1 | 3/2008 | Schulz |
| 2008/0080395 A1 | 4/2008 | Law et al. |
| 2008/0082449 A1 | 4/2008 | Wilkinson et al. |
| 2008/0123669 A1 | 5/2008 | Oliveti et al. |
| 2008/0140888 A1 | 6/2008 | Blair et al. |
| 2008/0181316 A1 | 7/2008 | Crawley et al. |
| 2008/0189441 A1 | 8/2008 | Jundt et al. |
| 2008/0194124 A1 | 8/2008 | Di |
| 2008/0209216 A1 | 8/2008 | Kelly et al. |
| 2008/0285755 A1 | 11/2008 | Camus et al. |
| 2008/0303351 A1 | 12/2008 | Jansen et al. |
| 2009/0036164 A1 | 2/2009 | Rowley |
| 2009/0061678 A1 | 3/2009 | Minoo et al. |
| 2009/0066291 A1 | 3/2009 | Tien et al. |
| 2009/0083843 A1 | 3/2009 | Wilkinson, Jr. et al. |
| 2009/0091513 A1 | 4/2009 | Kuhn |
| 2009/0092248 A1 | 4/2009 | Rawson |
| 2009/0121704 A1 | 5/2009 | Shibahara |
| 2009/0204458 A1 | 8/2009 | Wiese et al. |
| 2009/0217043 A1 | 8/2009 | Metke et al. |
| 2009/0222885 A1 | 9/2009 | Batke et al. |
| 2009/0234998 A1 | 9/2009 | Kuo |
| 2009/0239468 A1 | 9/2009 | He et al. |
| 2009/0245245 A1 | 10/2009 | Malwankar et al. |
| 2009/0254655 A1 | 10/2009 | Kidwell et al. |
| 2009/0256717 A1 | 10/2009 | Iwai |
| 2009/0278509 A1 | 11/2009 | Boyles et al. |
| 2009/0287321 A1 | 11/2009 | Lucas et al. |
| 2009/0288732 A1 | 11/2009 | Gielen |
| 2010/0052428 A1 | 3/2010 | Imamura et al. |
| 2010/0066340 A1 | 3/2010 | Delforge |
| 2010/0082869 A1 | 4/2010 | Lloyd et al. |
| 2010/0122081 A1 | 5/2010 | Sato et al. |
| 2010/0148721 A1 | 6/2010 | Little |
| 2010/0149997 A1 | 6/2010 | Law et al. |
| 2010/0151816 A1 | 6/2010 | Besehanic et al. |
| 2010/0153751 A1 | 6/2010 | Tseng et al. |
| 2010/0197366 A1 | 8/2010 | Pattenden et al. |
| 2010/0197367 A1 | 8/2010 | Pattenden et al. |
| 2010/0233889 A1 | 9/2010 | Kiani et al. |
| 2010/0262312 A1 | 10/2010 | Kubota et al. |
| 2011/0010016 A1 | 1/2011 | Giroti |
| 2011/0038114 A1 | 2/2011 | Pance et al. |
| 2011/0057291 A1 | 3/2011 | Slupsky et al. |
| 2011/0066309 A1 | 3/2011 | Matsuoka et al. |
| 2011/0074349 A1 | 3/2011 | Ghovanloo |
| 2011/0080056 A1 * | 4/2011 | Low ..................... H02J 50/12 |
| | | 307/104 |
| 2011/0082621 A1 | 4/2011 | Berkobin et al. |
| 2011/0089900 A1 | 4/2011 | Hogari |
| 2011/0140538 A1 | 6/2011 | Jung et al. |

(56) References Cited

U.S. PATENT DOCUMENTS

| | | |
|---|---|---|
| 2011/0150431 A1 | 6/2011 | Klappert |
| 2011/0172940 A1 | 7/2011 | Wood et al. |
| 2011/0185196 A1 | 7/2011 | Asano et al. |
| 2011/0196997 A1 | 8/2011 | Ruberg et al. |
| 2011/0197009 A1 | 8/2011 | Agrawal |
| 2011/0202992 A1 | 8/2011 | Xiao et al. |
| 2011/0285847 A1 | 11/2011 | Riedel et al. |
| 2011/0291491 A1* | 12/2011 | Lemmens ............. H02J 50/12 307/104 |
| 2011/0296066 A1 | 12/2011 | Xia |
| 2011/0313547 A1 | 12/2011 | Hernandez et al. |
| 2012/0028498 A1 | 2/2012 | Na et al. |
| 2012/0036364 A1 | 2/2012 | Yoneda et al. |
| 2012/0046015 A1 | 2/2012 | Little |
| 2012/0053742 A1 | 3/2012 | Tsuda |
| 2012/0102334 A1 | 4/2012 | O'Loughlin et al. |
| 2012/0124373 A1 | 5/2012 | Dangoor et al. |
| 2012/0143586 A1 | 6/2012 | Vetter et al. |
| 2012/0159210 A1 | 6/2012 | Hosaka |
| 2012/0204033 A1 | 8/2012 | Etchegoyen et al. |
| 2012/0236769 A1 | 9/2012 | Powell et al. |
| 2012/0242459 A1 | 9/2012 | Lambert |
| 2012/0265361 A1 | 10/2012 | Billingsley et al. |
| 2012/0271576 A1 | 10/2012 | Kamel et al. |
| 2012/0274273 A1 | 11/2012 | Jacobs et al. |
| 2012/0282805 A1 | 11/2012 | Ku et al. |
| 2012/0284354 A1* | 11/2012 | Mukundan .......... H04L 49/1576 709/208 |
| 2012/0284514 A1 | 11/2012 | Lambert |
| 2012/0295451 A1 | 11/2012 | Hyun-Jun et al. |
| 2012/0297101 A1 | 11/2012 | Neupaertl et al. |
| 2012/0311071 A1 | 12/2012 | Karaffa et al. |
| 2012/0322513 A1 | 12/2012 | Pattenden et al. |
| 2012/0328094 A1 | 12/2012 | Pattenden et al. |
| 2013/0011719 A1 | 1/2013 | Yasui et al. |
| 2013/0026973 A1 | 1/2013 | Luke et al. |
| 2013/0031382 A1 | 1/2013 | Jau et al. |
| 2013/0070788 A1 | 3/2013 | Deiretsbacher et al. |
| 2013/0082641 A1 | 4/2013 | Nishibayashi et al. |
| 2013/0170258 A1 | 7/2013 | Calvin et al. |
| 2013/0173832 A1 | 7/2013 | Calvin et al. |
| 2013/0211547 A1 | 8/2013 | Buchdunger et al. |
| 2013/0212390 A1 | 8/2013 | Du et al. |
| 2013/0224048 A1 | 8/2013 | Gillingwater et al. |
| 2013/0233924 A1 | 9/2013 | Burns |
| 2013/0244062 A1 | 9/2013 | Teramoto et al. |
| 2013/0290706 A1 | 10/2013 | Socky et al. |
| 2013/0291085 A1 | 10/2013 | Chong et al. |
| 2014/0015488 A1 | 1/2014 | Despesse |
| 2014/0068712 A1 | 3/2014 | Frenkel et al. |
| 2014/0075186 A1 | 3/2014 | Austen |
| 2014/0089692 A1 | 3/2014 | Hanafusa |
| 2014/0091623 A1 | 4/2014 | Shippy et al. |
| 2014/0095867 A1 | 4/2014 | Smith et al. |
| 2014/0097672 A1 | 4/2014 | Takemura et al. |
| 2014/0129162 A1 | 5/2014 | Hallman et al. |
| 2014/0131450 A1 | 5/2014 | Gordon et al. |
| 2014/0142725 A1 | 5/2014 | Boyd |
| 2014/0280520 A1 | 9/2014 | Baier et al. |
| 2014/0285318 A1 | 9/2014 | Audéon et al. |
| 2014/0312913 A1 | 10/2014 | Kikuchi et al. |
| 2014/0327318 A1 | 11/2014 | Calvin et al. |
| 2014/0335703 A1 | 11/2014 | Calvin et al. |
| 2014/0341220 A1 | 11/2014 | Lessmann |
| 2015/0019790 A1 | 1/2015 | Calvin et al. |
| 2015/0046701 A1 | 2/2015 | Rooyakkers et al. |
| 2015/0048684 A1 | 2/2015 | Rooyakkers et al. |
| 2015/0115711 A1 | 4/2015 | Kouroussis et al. |
| 2015/0303729 A1 | 10/2015 | Kasai et al. |
| 2015/0365240 A1 | 12/2015 | Callaghan |
| 2016/0036098 A1 | 2/2016 | Washiro |
| 2016/0065656 A1 | 3/2016 | Patin et al. |
| 2016/0069174 A1 | 3/2016 | Cannan et al. |
| 2016/0141894 A1 | 5/2016 | Beaston |
| 2016/0172635 A1 | 6/2016 | Stimm et al. |
| 2016/0224048 A1 | 8/2016 | Rooyakkers et al. |
| 2016/0301695 A1 | 10/2016 | Trivelpiece et al. |
| 2020/0310480 A1 | 10/2020 | Rooyakkers et al. |
| 2021/0109161 A1 | 4/2021 | Huot-Marchand et al. |

FOREIGN PATENT DOCUMENTS

| | | |
|---|---|---|
| CN | 1440254 A | 9/2003 |
| CN | 2596617 Y | 12/2003 |
| CN | 1571335 A | 1/2005 |
| CN | 1702582 A | 11/2005 |
| CN | 1839581 A | 9/2006 |
| CN | 1864305 A | 11/2006 |
| CN | 2899151 Y | 5/2007 |
| CN | 101005359 A | 7/2007 |
| CN | 101069407 A | 11/2007 |
| CN | 101262401 A | 9/2008 |
| CN | 101322089 A | 12/2008 |
| CN | 101349916 A | 1/2009 |
| CN | 101447861 A | 6/2009 |
| CN | 101533380 A | 9/2009 |
| CN | 101576041 A | 11/2009 |
| CN | 201515041 U | 6/2010 |
| CN | 101809557 A | 8/2010 |
| CN | 201590580 U | 9/2010 |
| CN | 101919139 A | 12/2010 |
| CN | 101977104 A | 2/2011 |
| CN | 102035220 A | 4/2011 |
| CN | 102123031 A | 7/2011 |
| CN | 102236329 A | 11/2011 |
| CN | 102237680 A | 11/2011 |
| CN | 202205977 U | 4/2012 |
| CN | 102480352 A | 5/2012 |
| CN | 1934766 B | 6/2012 |
| CN | 102546707 A | 7/2012 |
| CN | 102809950 A | 12/2012 |
| CN | 102812578 A | 12/2012 |
| CN | 103064032 A | 4/2013 |
| CN | 203180248 U | 9/2013 |
| CN | 103376766 A | 10/2013 |
| CN | 103682883 A | 3/2014 |
| CN | 103701919 A | 4/2014 |
| CN | 203645015 U | 6/2014 |
| CN | 104025387 A | 9/2014 |
| CN | 203932181 U | 11/2014 |
| CN | 104185969 A | 12/2014 |
| CN | 104297691 A | 1/2015 |
| CN | 104505894 A | 4/2015 |
| CN | 204243110 U | 4/2015 |
| CN | 105278327 A | 1/2016 |
| CN | 105556762 A | 5/2016 |
| CN | 104025387 B | 7/2018 |
| DE | 102013213550 A1 | 1/2015 |
| EP | 0473336 A2 | 3/1992 |
| EP | 0507360 A2 | 10/1992 |
| EP | 1176616 A2 | 1/2002 |
| EP | 1241800 A1 | 9/2002 |
| EP | 1246563 A1 | 10/2002 |
| EP | 1571559 A1 | 9/2005 |
| EP | 1877915 A2 | 1/2008 |
| EP | 1885085 A1 | 2/2008 |
| EP | 2179364 A2 | 4/2010 |
| EP | 2317743 A1 | 5/2011 |
| EP | 2450921 A1 | 5/2012 |
| EP | 1396065 B1 | 7/2012 |
| EP | 2557657 A2 | 2/2013 |
| EP | 2557670 A2 | 2/2013 |
| EP | 1885085 B1 | 3/2013 |
| EP | 2613421 A1 | 7/2013 |
| EP | 2777796 A1 | 9/2014 |
| EP | 2806319 A2 | 11/2014 |
| EP | 2966806 A1 | 1/2016 |
| JP | S5974413 U | 5/1984 |
| JP | S59177226 U | 11/1984 |
| JP | H0163190 U | 4/1989 |
| JP | H02164012 A | 6/1990 |
| JP | H04153705 A | 5/1992 |
| JP | H04245411 A | 9/1992 |
| JP | H05346809 A | 12/1993 |

(56) References Cited

FOREIGN PATENT DOCUMENTS

| | | |
|---|---|---|
| JP | 07075143 | 3/1995 |
| JP | H0794354 A | 4/1995 |
| JP | H07105328 A | 4/1995 |
| JP | H07320963 A | 12/1995 |
| JP | H0837121 A | 2/1996 |
| JP | H0898274 A | 4/1996 |
| JP | H08241824 A | 9/1996 |
| JP | H08322252 A | 12/1996 |
| JP | H09182324 A | 7/1997 |
| JP | H09213548 A | 8/1997 |
| JP | H1189103 A | 3/1999 |
| JP | H1198215 A | 4/1999 |
| JP | H1198707 A | 4/1999 |
| JP | H11230504 A | 8/1999 |
| JP | H11235044 A | 8/1999 |
| JP | H11312013 A | 11/1999 |
| JP | 2000041068 A | 2/2000 |
| JP | 2000124890 A | 4/2000 |
| JP | 2000252143 A | 9/2000 |
| JP | 2001100809 A | 4/2001 |
| JP | 2001242971 A | 9/2001 |
| JP | 2001292176 A | 10/2001 |
| JP | 2001307055 A | 11/2001 |
| JP | 2002134071 A | 5/2002 |
| JP | 2002280238 A | 9/2002 |
| JP | 2002343655 A | 11/2002 |
| JP | 2002359131 A | 12/2002 |
| JP | 3370931 B2 | 1/2003 |
| JP | 2003047912 A | 2/2003 |
| JP | 2003068543 A | 3/2003 |
| JP | 2003142327 A | 5/2003 |
| JP | 2003152703 A | 5/2003 |
| JP | 2003152708 A | 5/2003 |
| JP | 2003216237 A | 7/2003 |
| JP | 2004501540 A | 1/2004 |
| JP | 2004303701 A | 10/2004 |
| JP | 2004532596 A | 10/2004 |
| JP | 2005020759 A | 1/2005 |
| JP | 2005038411 A | 2/2005 |
| JP | 2005513956 A | 5/2005 |
| JP | 2005151720 A | 6/2005 |
| JP | 2005250833 A | 9/2005 |
| JP | 2005275777 A | 10/2005 |
| JP | 2005531235 A | 10/2005 |
| JP | 2005327231 A | 11/2005 |
| JP | 2005332406 A | 12/2005 |
| JP | 2006060779 A | 3/2006 |
| JP | 2006164706 A | 6/2006 |
| JP | 2006180460 A | 7/2006 |
| JP | 2006223950 A | 8/2006 |
| JP | 2006238274 A | 9/2006 |
| JP | 2006254650 A | 9/2006 |
| JP | 2007034711 A | 2/2007 |
| JP | 2007096817 A | 4/2007 |
| JP | 2007519150 A | 7/2007 |
| JP | 2007238696 A | 9/2007 |
| JP | 2007252081 A | 9/2007 |
| JP | 2007535235 A | 11/2007 |
| JP | 2008008861 A | 1/2008 |
| JP | 2008172873 A | 7/2008 |
| JP | 2008215028 A | 9/2008 |
| JP | 2008257707 A | 10/2008 |
| JP | 2008538668 A | 10/2008 |
| JP | 4245411 B2 | 3/2009 |
| JP | 2009054086 A | 3/2009 |
| JP | 2009065759 A | 3/2009 |
| JP | 2009157913 A | 7/2009 |
| JP | 2009163909 A | 7/2009 |
| JP | 2009538112 A | 10/2009 |
| JP | 2010011351 A | 1/2010 |
| JP | 2010503134 A | 1/2010 |
| JP | 4439340 B2 | 3/2010 |
| JP | 2010515407 A | 5/2010 |
| JP | 2010135903 A | 6/2010 |
| JP | 2010205163 A | 9/2010 |
| JP | 2010233167 A | 10/2010 |
| JP | 2010533387 A | 10/2010 |
| JP | 2011078249 A | 4/2011 |
| JP | 2011217037 A | 10/2011 |
| JP | 2011223544 A | 11/2011 |
| JP | 2012033491 A | 2/2012 |
| JP | 5013019 B1 | 8/2012 |
| JP | 2012190583 A | 10/2012 |
| JP | 2012195259 A | 10/2012 |
| JP | 2013021798 A | 1/2013 |
| JP | 2013031358 A | 2/2013 |
| JP | 2013153596 A | 8/2013 |
| JP | 2013170258 A | 9/2013 |
| JP | 2013192389 A | 9/2013 |
| JP | 5362930 B1 | 12/2013 |
| JP | 2014507721 A | 3/2014 |
| JP | 2014080952 A | 5/2014 |
| JP | 2015023375 A | 2/2015 |
| JP | 2016021763 A | 2/2016 |
| JP | 2016512039 A | 4/2016 |
| JP | 2016149128 A | 8/2016 |
| JP | 2016527844 A | 9/2016 |
| JP | 6189479 B1 | 8/2017 |
| JP | 2019146257 A | 8/2019 |
| JP | 2020115457 A | 7/2020 |
| KR | 20020088540 A | 11/2002 |
| KR | 20050014790 A | 2/2005 |
| KR | 20060034244 A | 4/2006 |
| KR | 100705380 B1 | 4/2007 |
| KR | 100807377 B1 | 2/2008 |
| KR | 20130039174 A | 4/2013 |
| TW | 201310344 A | 3/2013 |
| WO | 0180442 A2 | 10/2001 |
| WO | 02097946 A2 | 12/2002 |
| WO | 2005070733 A1 | 8/2005 |
| WO | 2005081659 A2 | 9/2005 |
| WO | 2006059195 A1 | 6/2006 |
| WO | 2007041866 A1 | 4/2007 |
| WO | 2007148462 A1 | 12/2007 |
| WO | 2008083387 A2 | 7/2008 |
| WO | 2009032797 A2 | 3/2009 |
| WO | 2009142053 A1 | 11/2009 |
| WO | 2010117082 A1 | 10/2010 |
| WO | 2011104935 A1 | 9/2011 |
| WO | 2013031124 A1 | 3/2013 |
| WO | 2013033247 A1 | 3/2013 |
| WO | 2013102069 A1 | 7/2013 |
| WO | 2014061307 A1 | 4/2014 |
| WO | 2014147896 A1 | 9/2014 |
| WO | 2014179556 A1 | 11/2014 |
| WO | 2014179566 A1 | 11/2014 |
| WO | 2015020633 A1 | 2/2015 |

OTHER PUBLICATIONS

Canadian Office Action for Application No. 2920133 dated Jan. 30, 2017.
Canadian Office Action for Application No. 2920133 dated Oct. 19, 2016.
CGI, White Paper on "Public Key Encryption and Digital Signature: How do they work?", 2004 (refer to pp. 3-4).
Chen, et al., "Active Diagnosability of Discrete Event Systems and its Application to Battery Fault Diagnosis," IEEE Transactions on Control Systems Technology, vol. 22, No. 5, Sep. 2014.
Chinese Office Action for Application No. 201380079515.9 dated Aug. 7, 2018.
Chinese Office Action for Application No. 201380079515.9 dated Nov. 16, 2017.
Chinese Office Action for Application No. 202010105899.9, dated Dec. 3, 2020.
Chinese Office Action for Application No. CN201610239130.X dated Aug. 2, 2017.
Chinese Office Action for Application No. CN201610239130.X dated Feb. 14, 2018.
Chinese Office Action for Application No. 201410383686.7 dated May 31, 2017.

(56) References Cited

OTHER PUBLICATIONS

Chinese Office Action for Application No. 201410799473.2, dated Oct. 12, 2018.
Chinese Office Action for Application No. CN201410182071.8 dated Mar. 1, 2017 .
D. Dzung, M. Naedele, T. P. Von Hoff and M. Crevatin, "Security for Industrial Communication Systems," in Proceedings of the IEEE, vol. 93, No. 6, pp. 1152-1177, Jun. 2005, doi: 10.11 09/JPROC. 2005.849714. (Year: 2005).
Decision for Rejection for Japanese Application No. 2021-160356, dated Jun. 22, 2023.
Decision of Dismissal of Amendment for Japanese Application 2021-117572, dated May 12, 2023.
Decision of Reexamination of Chinese Application No. 201711349441. 2, dated May 23, 2023.
Decision of Rejection for Chinese Application No. 201711349441. 2, dated Jun. 23, 2022.
Decision of Rejection for Japanese Application No. 2014-243830, dated Mar. 18, 2020.
Decision of Rejection for Japanese Application No. 2021-148592, dated May 10, 2023.
Decision of Rejection for Japanese Patent Application No. 2021-112729, dated Feb. 6, 2023.
Decision of Rejection for Patent Application No. 2014-243827, dated Nov. 28, 2019.
Decisionof Rejection for Chinese Application No. 2015103905202. 2, dated Nov. 5, 2019.
Emerson Process Management, "DeltaV Digital Automation System—System Overview," XP055402326, Jan. 1, 2009, pp. 1-40.
European Examination Report for Application No. 14196406.4, dated May 12, 2020.
European Search Report dated Dec. 2, 2015 for EP Application No. 14196408.0.
European Search Report for Application No. 20173319.3, dated Nov. 24, 2020.
European Search Report for EP Application No. 14196408.0, dated Nov. 24, 2015.
European Search Report for European Application No. 14196406.4, dated Sep. 23, 2015.
European search report for European Patent Application No. EP14196406 dated Oct. 2, 2015, 6 pages.
European Search Report in Application No. 12862174.5, dated Feb. 15, 2016.
European Search Report published Nov. 4, 2015 in Application No. EP14196406.4 .
Examination Report for Application No. EP20201403.1, dated Aug. 10, 2023.
Examination Report for European Application No. 14180106.8, dated Jun. 28, 2017.
Examination Report for European Application No. 14196406.4, dated Mar. 31, 2021.
Examination Report for European Application No. 17178867.2, dated Mar. 13, 2019.
Examination Report for European Application No. 21187809.5, dated Jan. 3, 2023.
Examination Report for European Application No. 13891327.2, dated Sep. 26, 2018.
Examination Report for European Application No. 16165112.0, dated Apr. 17, 2019.
Examination Report for European Application No. 16165112.0, dated Feb. 16, 2018.
Examination Report for European Patent Application No. 16154943. 1, dated May 16, 2019.
Examination Report for European Patent Application No. 1720883. 8, dated Oct. 29, 2019.
Examination Report in European Application No. 17208183.8, dated Feb. 27, 2019.
Extended European Search Report for 21187809.5, dated Nov. 29, 2021.
Extended European Search Report for Application No. 22206775.3, dated May 2, 2023.
Extended European Search Report for Application No. EP14180106. 8, dated Aug. 12, 2015.
Extended European Search Report for European Application No. 20150993.2, dated Apr. 29, 2020.
Extended European Search Report for European Application No. 20201408.0, dated Apr. 7, 2021.
Extended European Search Report for European Application No. 22206775.3, dated May 5, 2023.
Extended European Search Report for European Patent Application No. EP 14166908 dated Jan. 7, 2015, 10 pages.
Extended European Search Report for European Patent Application No. EP 14196409 dated May 31, 2016, 10pages.
Extended European Search Report for European Patent Application No. EP 16154943 dated Jun. 29, 2016, 9pages.
Extended European Search Report for European Patent Application No. EP 17178867 dated Nov. 2, 2017, 13pages.
Extended European Search Report for European Patent Application No. EP 18176358 dated Sep. 11, 2018, 11 pages.
Extended European Search Report in European Application No. 17208183.8, dated Jun. 22, 2018.
Extended European Search Reported for European Application No. 20201403.1, dated Apr. 29, 2021.
Extended Search Report for European Application No. 14180106.8, dated Jul. 13, 2015.
Extented European search report for European Patent Application No. EP16165112 dated Sep. 6, 2016, 12 pages.
Fabien F., "Raspberry Pi + Mihini, Controlling an off-the-grid Electrical Installation, Part I," Apr. 11, 2014, XP055290314.
Fang et al., "Application of expert diagnosis system in rechargeable battery," Department of Computer Science, Qinghua University, Beijing, China, vol. 26, No. 3, Jun. 2002.
Final Decision for Rejection for Patent Application No. 2016-021763, dated Jul. 31, 2020.
Final Decision of Rejection and Decision of Dismissal of Amendment for Japanese Application No. 2016-080207, dated Sep. 10, 2021.
Generex System Gmbh, "BACS—Battery Analysis Care System," Aug. 17, 2014 , XP055290320, Retrieved from the Internet: URL :HTTP://web.archive.org/we/2040929060116/ http://www.generex. de/generex/download/datasheets/datasheet_BACS_C20_de.pdf.
Generex Systems Gmbh, "SACS—Battery Analysis & Care System," Aug. 17, 2014, XP055290320.
Hosseinabady, Mohammad, et al., "Using the inter- and intra-switch regularity in NoC switch testing," Design, Automation Test in Europe Conference Exhibition: Nice, France, Apr. 16-20, 2007, IEEE Service Center, Apr. 16, 2007 (XP058290046).
International Search Report and Written Opinion dated May 12, 2014 in International Application# PCT/US2013/053721.
International Search Report and Written Opinion for PCT/US2014/ 036368, dated Sep. 12, 2014.
International Search Report and Written Opinion of the International Searching Authority dated Apr. 29, 2013, International Application No. PCT/US2012/072056.
International Search Report for Application No. PCT/US2013/ 053721 dated May 12, 2014.
"Introduction to Cryptography," NetWOrk Associates, Inc., PGP 6.5.1, 1990-1999, Retrieved@ [ftp://!ftp.pgpi.org/pub/pgp/6.5/docs/ english/IntroToCrypto.pdf] on Mar. 17, 2016, (refer to pp. 16-20).
Japanese Office Action for Application No. JP2014-550508 dated Sep. 15, 2017.
Keith S., et al. "Guide to Industrial Control Systems (ICS) Security," NIST, Special Publication 800-882, Jun. 2011, (refer to pp. 2-1 to 2-10).
Luo, X., Ji, X. and Park, M.S., 2010, April. Location privacy against traffic analysis attacks in wireless sensor networks. In 2010 International Conference on Information Science and Applications (pp. 1-6). IEEE. (Year: 2010).
Molva, R. Ed et al., "Internet security architecture", Computer Networks, Elsevier Science Publishers B. V., Amsterdam, NL, vol. 31, No. 8, Apr. 23, 1999, pp. 787-804, XP004304518.

(56) References Cited

OTHER PUBLICATIONS

Notice of Final Rejection for Korean Application No. 10-2016-0045717, dated Oct. 17, 2023.
Notice of Preliminary Rejection for Korean Application No. 10-2016-0015889, dated Jul. 6, 2022.
Notice of Preliminary Rejection for Korean Application No. 10-2016-0045717, dated Apr. 18, 2023.
Notice of Reason for Rejection for Japanese Application No. 2016-080207, dated Feb. 4, 2021.
Notice of Reason for Rejection for Japanese Application No. 2016-080207, dated Jun. 4, 2020.
Notice of Reason for Rejection for Japanese Application No. 2014-243827, dated Feb. 1, 2021.
Notice of Reason for Rejection for Japanese Application No. 2014-243827, dated Jan. 24, 2019.
Notice of Reason for Rejection for Japanese Patent Application No. 2014-243830, dated Jul. 10, 2019.
Notice of Reason for Rejection for Japanese Patent Application No. 2014-243830, dated Sep. 21, 2018 .
Notice of Reason for Rejection for JP Patent Application No. 2018-109151, dated Jun. 25, 2019.
Notice of Reason for Rejection for Patent Application No. 2016-021763, dated Nov. 27, 2019.
Notice of Reason for Rejection for Patent Application No. 2022-002389, dated Mar. 17, 2023.
Notice of Reason for Rejection for Patent Application No. 2022-002389, dated Nov. 25, 2022.
Notice of Reasons for Rejection dated Jul. 13, 2017 for Japanese Application No. JP2016-533279.
Notice of Reasons for Rejection dated Mar. 1, 2018 for Japanese Application No. JP2016-533279.
Notice of Reasons for Rejection for Japanese Application No. 2022-092303, dated Aug. 31, 2023.
Notice of Reasons for Rejection for Japanese Patent Application No. 2020-035778, dated Apr. 15, 2021.
Notice of Reasons for Rejection for Japanese Patent Application No. 2021-148592, dated Oct. 28, 2022.
Notification of the Second Office Action for Chinese Application No. 201380079514.4, dated Nov. 5, 2018.
Office Action dated Dec. 2, 2016 for JP Application No. 2014-550508.
Office Action dated Feb. 5, 2018 for Chinese Application No. CN201380079514.4.
Office Action for Canadian Application No. 2,875,515 dated Feb. 17, 2016.
Office Action for Canadian Application No. 2,875,515, dated Jun. 1, 2016.
Office Action for Canadian Application No. 2,875,515, dated Oct. 6, 2016.
Office Action in Japan for Application No. 2021-160356, dated Dec. 16, 2022.
Office Actionfor Chinese Application No. 201280065564.2, dated Feb. 28, 2017.
Office Actionfor Japanese Application No. 2015-136186, dated Oct. 10, 2019.
Partial European Search Report for European Patent Application No. EP 15175744 dated Jan. 4, 2016, 7 pages.
Partial European Search Report in European Application No. 17208183.8, dated Mar. 28, 2018.
Partial Search Report for European Application No. 15175744.0, dated Dec. 14, 2015.
Partial Supplementary European Search Report dated Nov. 10, 2015 in Application# EP12862174.5.
Partial Supplementary European Search Report in Application No. 12862174.5, dated Nov. 3, 2015.
Reason for Rejection for Japanese Application No. 2015-136186, dated May 7, 2020.
Reason for Rejection for Japanese Application No. 2020-061935, dated Mar. 31, 2021.
Reason for Rejection in Japanese Patent Application No. 2016-533279, dated Aug. 13, 2018.
Reasons for Rejection for Japanese Application No. 2021-138773, dated Jun. 29, 2022.
Rodrigues A., "SCADA Security Device: Design and Implementation", Master of Science Thesis, Wichita State University, Dec. 2011.
Rodrigues, A., et al., "SCADA security device", Proceedings of the Seventh Annual Workshop on Cyber Security and Information Intelligence Research, CSIIRW '11, Jan. 1, 2011, p. 1, XP055230335, New York, New York, USA.
Roman Kleinerman, Daniel Feldman (May 2011), Power over Ethernet (POE): An Energy-Efficient Alternative (PDF), Marvell, retrieved Sep. 25, 2018 @ http://www.marvell.com/switching/assets/Marveii-PoE-An-Energy-Efficient-Alternative.pdf (Year: 2011).
Search Report for European Application No. 14196406.4, dated Nov. 4, 2015.
Search Report for European Application No. 14196409.8, dated May 19, 2016.
Search Report for European Application No. 15175744.0, dated Apr. 26, 2016.
Search Report for European Application No. 16154943.1 dated Jun. 17, 2016.
Seimens Ag, "ERTEC400—Enhanced Real-Time Ethernet Controller—Handbuch," XP002637652, Version 1.2.2, Jul. 31, 2010, pp. 1-98.
Shrnatikov, V. and Wang, M. H. Timing Analysis in Low-Latency Mix Networks: Attacks and Defenses. In ESORICS 2006, pp. 18-33 . (Year: 2006).
Siemens AG: "ERTEC 400 | Enhanced Real-Time Ethernet Controller | Handbuch", No. Version 1.2.2 pp. 1-98, XP002637652, Retrieved from the Internet: URL: http:llcache.automation.siemens.comldniiDUIDUxNDgzNwAA_21631481_HBIERTEC400_Handbuch_V122.pdf [retrieved on May 2, 2011].
Siemens, "Uninterruptible 24 V DC Power Supply High-Performance, communicative and integrated in TIA," Mar. 31, 2015,XP055290324.
Summons to attend oral proceedings for European Application No. 14196409.8, dated Nov. 13, 2019.
Supplementary European Search Report for European Patent Application No. EP 13890953 dated Feb. 6, 2017, 9 pages.
Supplementary European Search Report for European Patent Application No. EP 14791210 dated Dec. 16, 2016, 11 pages.
Supplementary Search Report for European Application No. 13890953.6 dated Jan. 26, 2017.
Supplementary Search Report for European Application No. 13891327.2, dated Jan. 10, 2017.
Supplementary Search Report for European Application No. 14791210.9, dated Dec. 6, 2016.
Zafirovic-Vukotic, M. et al., "Secure SCADA network supporting NERC CIP", Power Energy Society General Meeting, 2009, PES '09, IEEE, Piscataway, NJ, USA, Jul. 26, 2009, pp. 1-8, XP031538542.
Office Action for Canadian Application No. 2,875,518, dated Apr. 22, 2016.
Office Action for Canadian Application No. 2,875,518, dated Jun. 3, 2015.
Office Action for Canadian Application No. 2,920,133, dated Apr. 14, 2016.
Office Action for Canadian Application No. 2,920,133, dated Jan. 30, 2017.
Office Action for Canadian Application No. 2,920,133, dated Oct. 19, 2016.
Office Action for Canadian Application No. 2,875,515 dated Feb. 10, 2017 .
Office Action for Canadian Application No. 2,875,515 dated Jul. 5, 2017.
Office Action for Candian Application No. 2,875,517 dated May 4, 2015.
Office Action for Chinese Application No. 201280065564.2, dated Aug. 3, 2016.
Office Action for Chinese Application No. 201280065564.2 dated Oct. 19, 2017.
Office Action for Chinese Application No. 201410383686.7, dated Feb. 23, 2018.

(56) References Cited

OTHER PUBLICATIONS

Office Action for Chinese Application No. 20141079995.2, dated Jul. 3, 2019.
Office Action for Chinese Application No. 201480034066.0, dated May 3, 2017.
Office Action for Chinese Application No. 2015103905202.2, dated Jun. 20, 2018.
Office Action for Chinese Application No. 2015103905202.2, dated Mar. 6, 2019.
Office Action for Chinese Application No. 2015103905202.2, dated Aug. 6, 2019.
Office Action for Chinese Application No. 201610229230.4, dated Mar. 18, 2021.
Office Action for Chinese Application No. 201711349441.2, dated May 27, 2021.
Office Action for Chinese Application No. 201910660260.4, dated Nov. 18, 2021.
Office Action for Chinese Application No. 2020101058999, dated Sep. 3, 2021.
Office Action for Chinese Application No. 201410802889.5 dated Jul. 26, 2018.
Office Action for Chinese Appln No. 201380079515.9, dated Feb. 25, 2019.
Office Action for Chinese Patent Application 201410802889.5, dated May 7, 2019.
Office Action for Chinese Patent Application No. 201610236358.3, dated Jan. 25, 2021.
Office Action for Chinese Patent Application No. 201610236358.3, dated Jun. 24, 2020.
Office Action for Chinese Patent Application No. 201610236358.3, dated Sep. 4, 2019.
Office Action for Chinese Patent Application No. 201711349441.2, dated Mar. 20, 2023.
Office Action for EP Application No. 14196409.8 dated Jan. 22, 2018.
Office Action for Japanese Application No. 2014-080952, dated Jan. 7, 2019.
Office Action for Japanese Application No. 2014-080952, dated May 2, 2018.
Office Action for Japanese Application No. 2014-159475, dated Feb. 15, 2019.
Office Action for Japanese Application No. 2014-159475, dated Jun. 11, 2018.
Office Action for Japanese Application No. 2014-243830, dated Jun. 29, 2021.
Office Action for Japanese Application No. 2016-021763, dated Jun. 11, 2021.
Office Action for Japanese Application No. 2016-512039, dated Feb. 5, 2019.
Office Action for Japanese Application No. 2016-512039, dated Jun. 5, 2018.
Office Action for Japanese Application No. 2016-533280, dated Apr. 11, 2018.
Office Action for Japanese Application No. 2016-533280, dated Jan. 7, 2019.
Office Action for Japanese Application No. 2016-533280, dated Jun. 29, 2020.
Office Action for Japanese Application No. 2017-237592, dated Dec. 27, 2021.
Office Action for Japanese Application No. 2020-135564, dated Jul. 20, 2021.
Office Action for Japanese Application No. 2020-135564, dated Mar. 8, 2022.
Office Action for Japanese Application No. 2020-135564, dated Sep. 14, 2022.
Office Action for Japanese Application No. 2021-112729, dated Jun. 27, 2022.
Office Action for Japanese Application No. 2021-117572, dated Oct. 14, 2022.
Office Action for Japanese Application No. 2016-533280, dated Jun. 28, 2017.
Office Action forChinese Patent Application 201410802889.5, dated Dec. 4, 2019.
Office Action from Chinese Patent Application No. 201610229230.4, dated Jul. 15, 2020.
Office Action from Chinese Patent Application No. 201610229230.4, dated Oct. 24, 2019.
Office Action from EP Application No. 14196406.4, dated Jul. 29, 2019.

* cited by examiner

ELECTROMAGNETIC CONNECTOR FOR FOR AN INDUSTRIAL CONTROL SYSTEM

BACKGROUND

Electrical connectors are mechanical assemblies used to complete an electrical circuit or join two or more electrical circuits together. Plug and socket type electrical connectors generally include a male plug and a female receptacle, with multiple pin or prong contacts in the male plug configured for insertion into openings in a mating socket of the female receptacle. Multi-pin connectors employ multiple metal pins. Thus, the connections between mating metal parts (e.g., pins and sockets) must be capable of furnishing good electrical connections to complete the electrical circuits. For example, multi-pin connectors are used as interconnects in Industrial Control Systems (ICS)/Process Control Systems (PCS) to connect Input/Output (I/O) devices to power and/or communications signal transmission circuitry. Such circuitry may be used by, for instance, a power backplane, where multiple electrical connectors are connected in parallel to a common electrical power supply. Other types of electrical connectors include: Eight Positions, Eight Conductors (8P8C) modular connectors used for Ethernet and Category 5 (CAT5) cables; D-subminiature connectors used for Recommended Standard 232 (RS-232) modem serial ports, computers, telecommunications, test/measurement instruments, monitors, joysticks, mice, and game consoles; Universal Serial Bus (USB) connectors, including Type A, Type B, Mini-A, Mini-B, Micro-A, and Micro-B connectors used for interfacing devices; electrical power connectors, such as Alternating Current (AC) power plugs and sockets (e.g., plugs having protruding prongs, blades, and/or pins that fit into matching slots and/or holes in sockets, receptacles, outlets, power points, and so forth), and Direct Current (DC) connectors, such as coaxial power connectors; as well as Radio Frequency (RF) connectors for transmitting RF signals; and the like.

SUMMARY

An electromagnetic connector is disclosed. In one or more implementations, the electromagnetic connector is configured to form a first magnetic circuit portion that comprises a first core member and a first coil disposed of the first core member. The electromagnetic connector is configured to mate with a second electromagnetic connector, where the second electromagnetic connector is configured to form a second magnetic circuit portion that comprises a second core member and a second coil disposed of the second core member. The first core member and the second core member are configured to couple the first coil to the second coil with a magnetic circuit formed from the first magnetic circuit portion and the second magnetic circuit portion when the electromagnetic connector is mated with the second electromagnetic connector. The magnetic circuit is configured to induce a signal in the first coil when the second coil is energized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and in FIGS. 2 through 15 may indicate similar or identical items.

Figure 15:
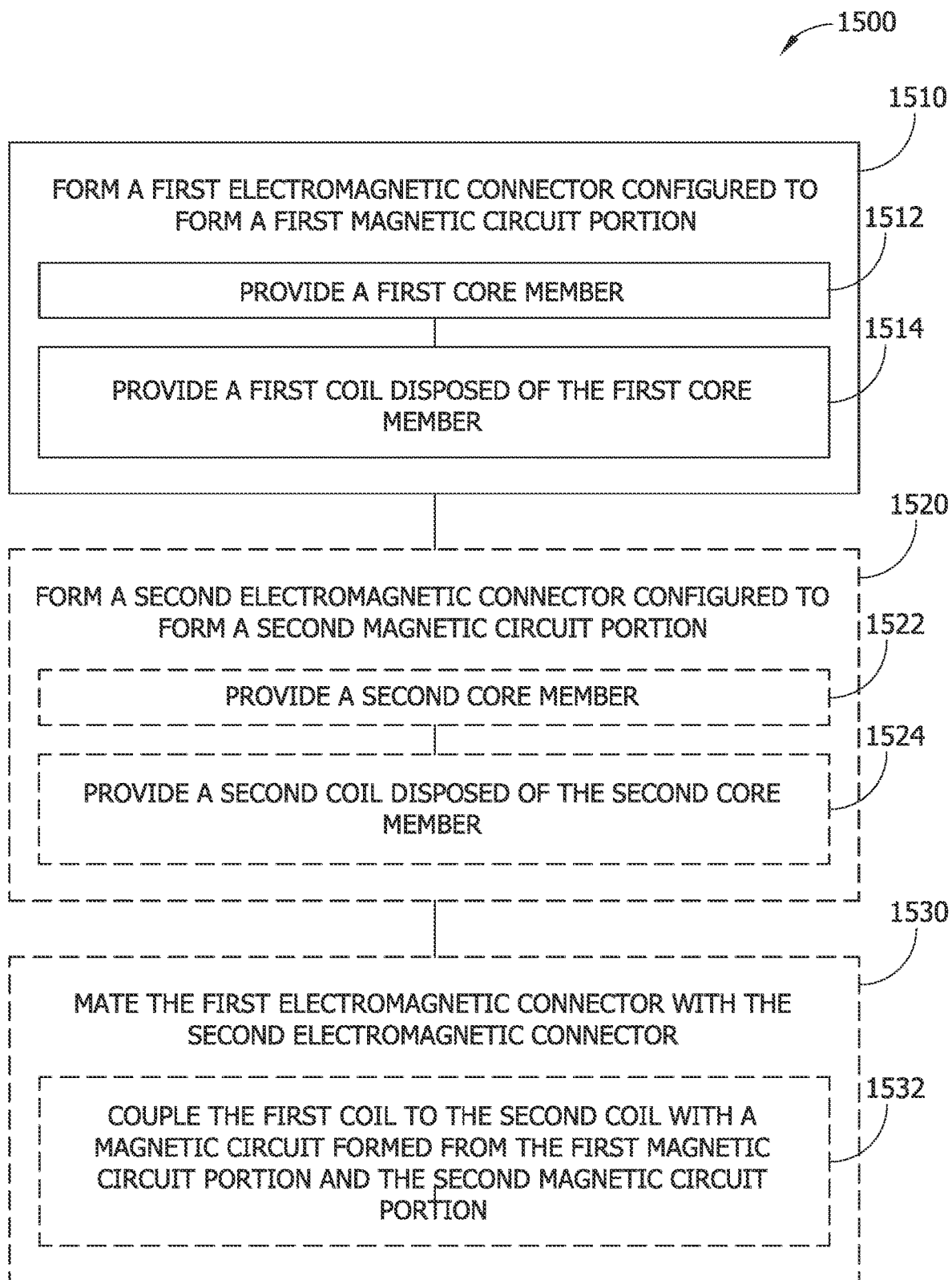

FIG. 15 is a flow diagram illustrating a process of forming a first electromagnetic connector configured to form a first magnetic circuit portion comprising a first core member and a first coil disposed of the first core member, forming a second electromagnetic connector configured to form a second magnetic circuit portion comprising a second core member and a second coil portion disposed of the second core member, and coupling the first coil to the second coil by mating the first electromagnetic connector with the second electromagnetic connector in accordance with example implementations of the present disclosure.

DETAILED DESCRIPTION

Overview

Multi-pin connectors are typically used in industrial control systems/process control systems to connect I/O devices to power and/or communications signal transmission circuitry included with a power backplane. The pin interconnects provide high precision signal resolution and are often constructed from high quality materials, such as hardened steel with gold plating, and so forth. Care must be taken when connecting and disconnecting multi-pin connectors to avoid bending or misaligning the various pins. Additionally, in both industrial settings and in the field, pin interconnects are often exposed to corrosive materials and contaminants, and may be subject to oxidation and coating, leading to intermittent failures. The nature and cause of the failures may be difficult and costly to determine. Thus, multi-pin connectors are generally a high cost and high maintenance component of industrial control systems hardware.

Figure 1:
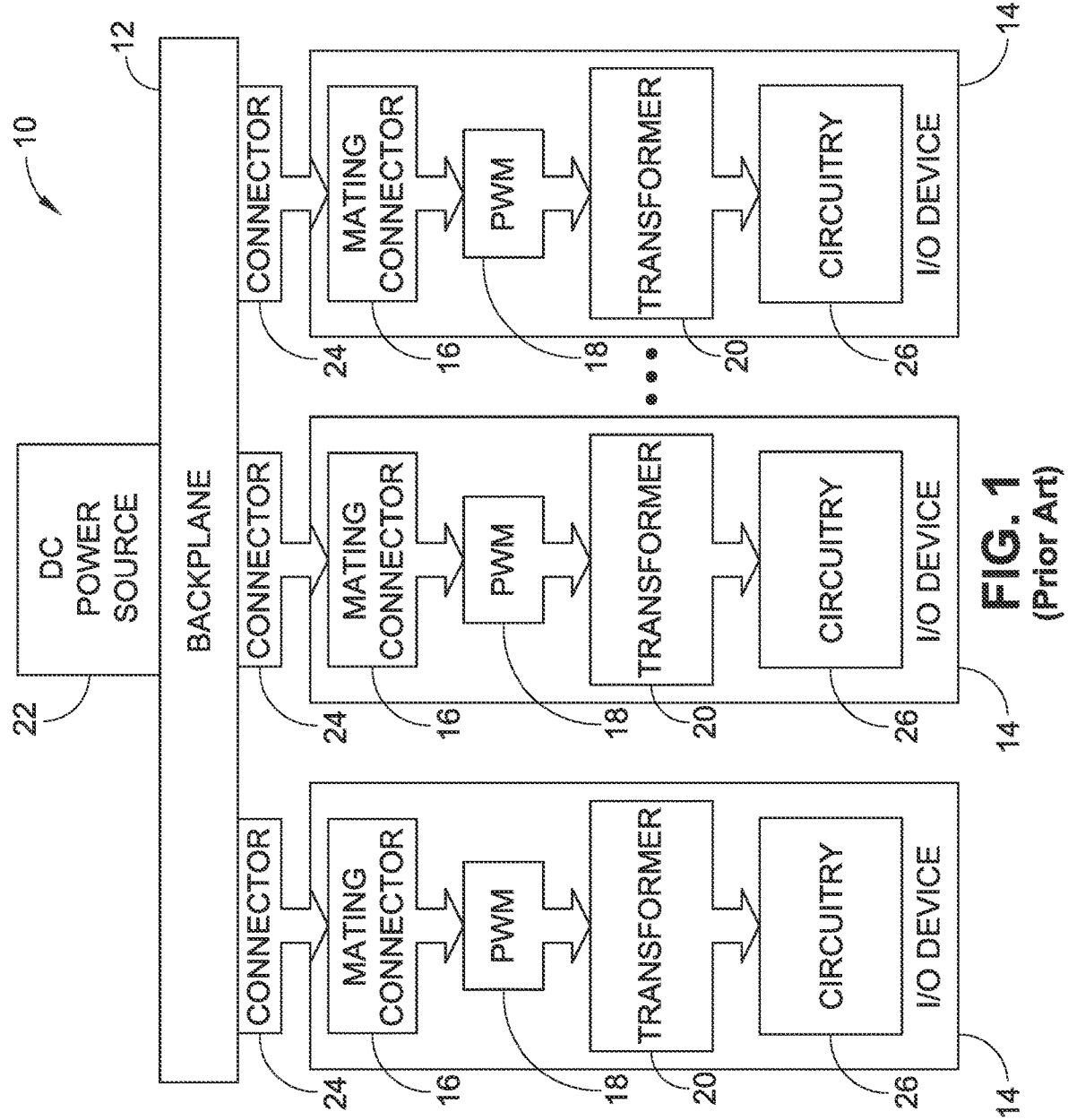
FIG. 1 is a block diagram illustrating an industrial control system using a backplane for power transmission, where arrows are used to indicate power flow.

Industrial control systems/process control systems may also require electrical isolation between I/O devices and associated power transmission and control equipment. For example, I/O devices typically use transformers and/or optical equipment for signal transmission to electrically isolate the I/O devices, prevent ground loops, and so forth. Industrial systems, such as the example system 10 shown in FIG. 1, may provide a backplane 12 for power and/or communications signal transmission, with pluggable I/O devices 14 connected to the backplane 12. Each pluggable I/O device 14 may use multi-pin connectors 16 for both power and communications transmissions, along with Pulse-Width Modulation (PWM)/Pulse-Duration Modulation (PDM) 18 and a power transformer 20 to achieve isolation between the backplane 12 and the I/O devices 14. For example, the backplane 12 may use a DC power source 22 and connectors 24 that mate with connectors 16 to deliver DC signals to the I/O devices 14. Each I/O device 14 may then use PWM 18 to convert the DC signals to AC and transformer 20 to deliver the power/communications signals to circuitry 26. The use of the high quality multi-pin connectors, PWM circuitry, and power transformers increases the cost and complexity of the I/O devices.

Accordingly, electromagnetic connector assemblies are described that employ electromagnetic connectors which form portions of a magnetic circuit. The electromagnetic connectors comprise a core member and a coil disposed of the core member. In implementations, the electromagnetic connectors are configured to mate with other electromagnetic connectors so that, when one electromagnetic connector is mated with another electromagnetic connector, the core members of the connectors couple the coil of the first connector to the coil of the second connector to complete the magnetic circuit. The magnetic circuit is configured to induce a signal in one coil when the other coil is energized.

Electromagnetic connectors configured in accordance with the present disclosure need not necessarily require precision contact, pressure, and/or alignment to complete the magnetic circuit linking the tightly coupled coils. In implementations, the electromagnetic connectors can be used in industrial control systems having a power backplane/bus configuration. For example, the electromagnetic connectors can be used with one or more I/O modules in place of the PWM, separate power transformer, and associated transistors that would otherwise be required for each I/O module to maintain isolation between the I/O modules and the power backplane. The electromagnetic connectors can also be used in place of multi-pin connectors for communications and/or power signal transmission. Eliminating multiple PWM's, power transformers, transistors, and multi-pin connectors can provide a significant cost and space savings for this type of configuration, along with increased galvanic isolation between sensor and control components. Further, contactless interconnection for signal transmission may provide more environmentally robust structures, reducing or eliminating field failures due to corrosion, pin misalignment, and so forth.

In one or more implementations, the electromagnetic connector assemblies may be employed in a system that includes a backplane for distributing an AC signal. The system may include a number of electromagnetic connectors coupled with the backplane. As described herein, the electromagnetic connectors comprise a core member and a coil disposed of the core member (e.g., as previously described). Each one of the electromagnetic connectors is configured to mate with another electromagnetic connector, which may be included within a module. When the electromagnetic connectors are mated, the coils are coupled via a magnetic circuit. The magnetic circuit is configured to induce a signal in a coil of the module when a coil of the backplane is energized. The backplane may be used to power and/or furnish communications with circuitry of the module.

The system can be configured for an industrial control system/process control system having a multidrop power backplane/bus configuration that transmits high frequency AC power using DC-to-AC (DC/AC) conversion circuitry and distributed transformers, with electromagnetic connectors configured as previously described. A system configured in accordance with the present disclosure can eliminate the use of a separate PWM for each I/O device, replacing multiple PWMs with, for example, a single PWM located on the backplane. Thus, the connector and power transformer configuration described with reference to FIG. 1 can be replaced with magnetic circuits (e.g., tightly coupled transformers). Each magnetic circuit may be configured as two portions (e.g., halves) of a transformer, where one portion (e.g., half) of the transformer is located in each module, and the other portion (e.g., half) is located in the backplane. The portion of the transformer in the backplane may comprise, for example, the primary coil and a portion of the core. The portion of the transformer in each module may comprise the secondary coil and a mating core. Electrical power in the primary coil is extracted by the secondary coil, and can then be rectified and used to power and/or communicate with circuitry in each module.

For example, a system configured in accordance with the present disclosure may be implemented as a communications control system that includes a switch fabric having a serial communications interface (e.g., a serial or Multidrop Bus (MDB) with a master and multiple slaves) and a parallel communications interface (e.g., a parallel or point-to-point bus implemented using a cross switch, or the like). The serial communications interface and the parallel communications interface may be used for connecting multiple Input/Output (I/O) modules to communications/control modules, and to one another.

The serial communications interface and the parallel communications interface may be formed on a single printed circuit board. The serial communications interface may be configured for connecting the plurality of input/output modules to a redundant control module in parallel, and the parallel communications interface may be configured for separately connecting the plurality of input/output modules to the redundant control module. Information transmitted via the serial communications interface and/or the parallel communications interface may be packetized. The control module may comprise a network interface for transmitting information collected from the plurality of input/output modules via a network, and so forth. Additionally, the communications control system may include a power module for supplying electrical power to at least one of the plurality of input/output modules.

Example Implementations

FIGS. 2 through 4D illustrate example electromagnetic connectors 100a and 100b of connector assemblies 110 in accordance with example implementations of the present disclosure. The electromagnetic connectors 100a and 100b may be used in any application where it is desirable to couple electrical circuits together for transmitting electrical signals and/or electrical power from one circuit to another, while maintaining isolation between the circuits. The electromagnetic connectors 100a and 100b can be used in applications including, but not necessarily limited to: industrial control systems/process control systems (e.g., to connect I/O devices with power and/or communications signal transmission circuitry), telecommunications (e.g., for audio, broadband, video, and/or voice transmission), information/data communications (e.g., for connecting computer networking equipment, such as Ethernet equipment, modems, and so forth), computer hardware interconnection (e.g., for connecting peripherals, such as joysticks, keyboards, mice, monitors, and so on), game consoles, test/measurement instruments, electrical power connectors (e.g., for power transmission from AC mains), and the like.

Figure 3A:
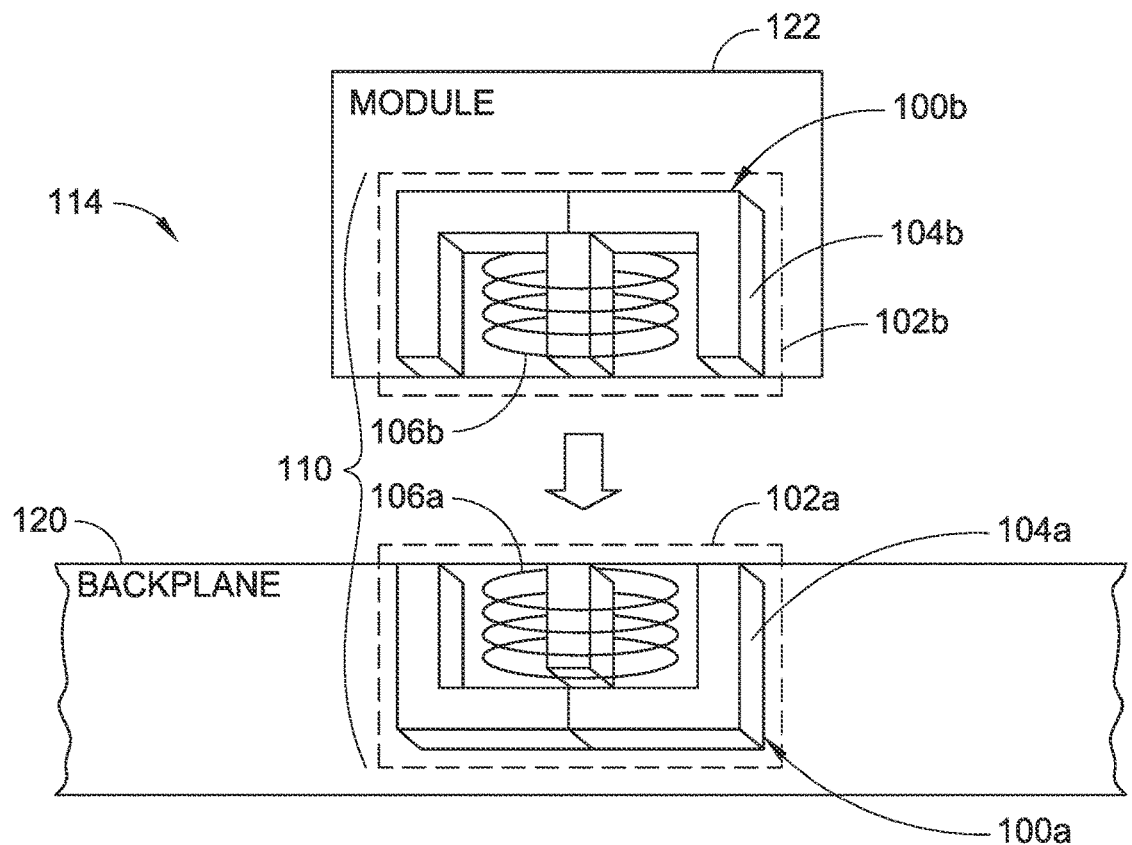
FIG. 3A is a diagrammatic illustration of a connector assembly comprising an E-shaped core member for coupling a module to a backplane in accordance with example implementations of the present disclosure.
Figure 3B:
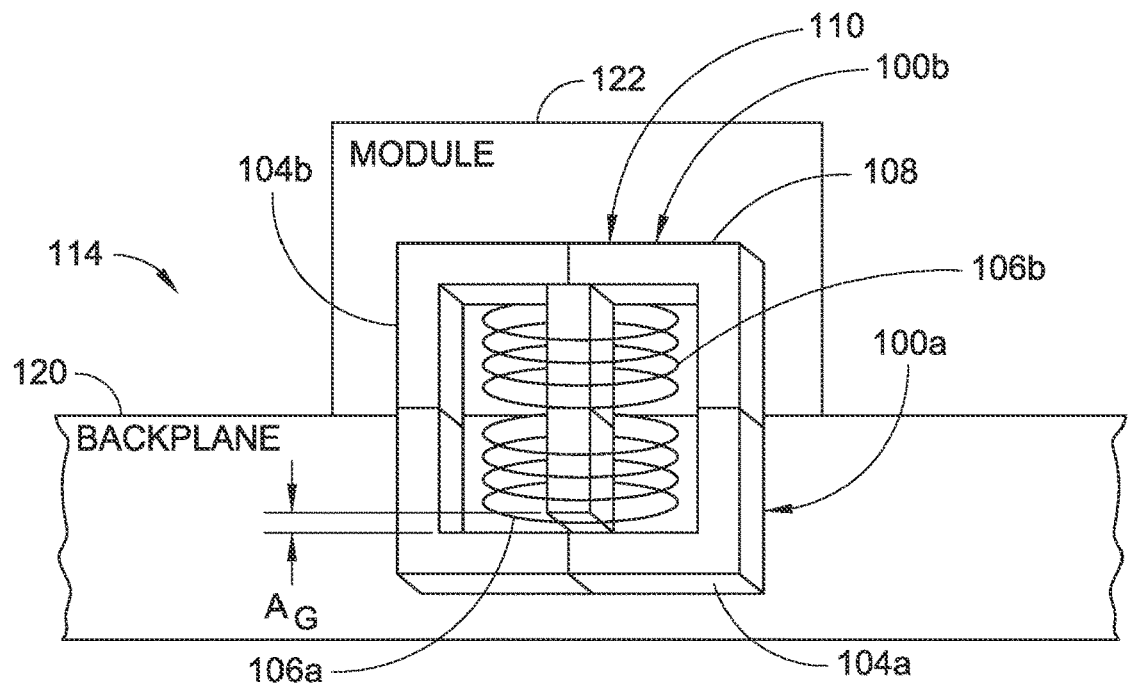
FIG. 3B is a diagrammatic illustration of the connector assembly illustrated in FIG. 3A, where electromagnetic connectors are mated to couple the module to the backplane.

Each one of the electromagnetic connectors 100a and 100b is configured to form a magnetic circuit portion 102a or 102b, which includes a core member 104a or 104b and a coil 106a or 106b disposed of (e.g., around or within) the core member 104a or 104b. For the purposes of the present disclosure, it should be noted that "core member" is used to refer to an incomplete part of a magnetic core, which is completed by another core member when the electromagnetic connectors 100a and 100b are coupled together. Each electromagnetic connector 100a or 100b is configured to mate with another electromagnetic connector 100a or 100b of a connector assembly 110 for transmitting power and/or communications signals between components that are connected via the electromagnetic connectors 100a and 100b. For example, a first core member 104a of an electromagnetic connector 100a can be configured to contact a second core member 104b of another electromagnetic connector 100b when the first electromagnetic connector 100a is mated with the second electromagnetic connector 100b (e.g., as shown in FIG. 3B). In this manner, a coil 106a of the first electromagnetic connector 100a can be tightly coupled to another coil 106b of the second electromagnetic connector 100b with a magnetic circuit 108 formed from the magnetic circuit portion 102a of the first electromagnetic connector 100a and the magnetic circuit portion 102b of the second electromagnetic connector 100b. The magnetic circuit 108 is configured to induce a signal in one of the coils 106a or 106b when the other coil 106a or 106b is energized, allowing power and/or communications signals to be transmitted between components that are connected via the electromagnetic connectors 100a and 100b. In implementations, the coils 106a and 106b can be tightly coupled (e.g., using an iron core to provide a coupling coefficient of about one (1)), critically coupled (e.g., where energy transfer in the passband is optimal), or overcoupled (e.g., where a secondary coil is close enough to a primary coil to collapse the primary coil's field).

Figure 4A:
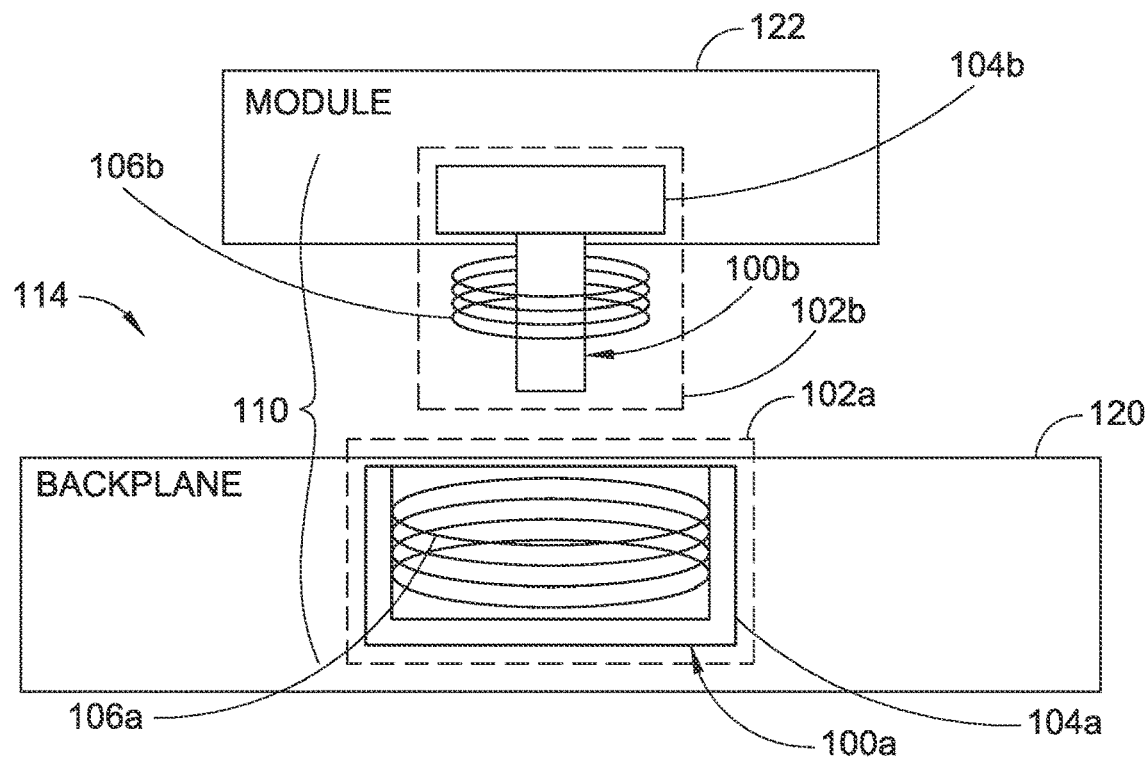
FIG. 4A is a diagrammatic illustration of a connector assembly comprising an interference core for coupling a module to a backplane in accordance with example implementations of the present disclosure.
Figure 4B:
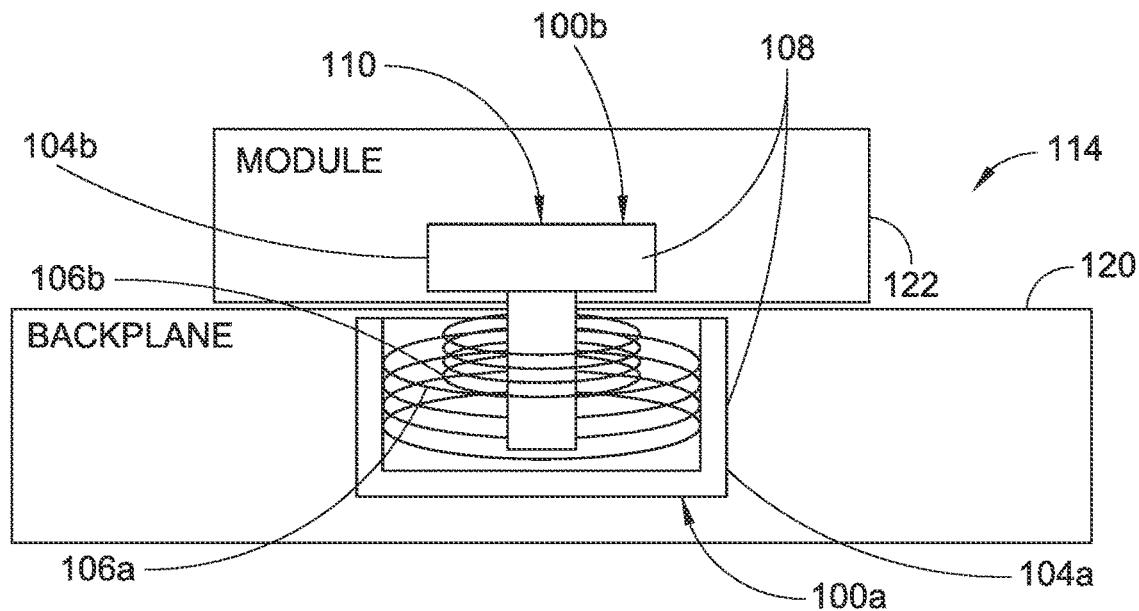
FIG. 4B is a diagrammatic illustration of the connector assembly illustrated in FIG. 4A, where electromagnetic connectors are mated to couple the module to the backplane.
Figure 4C:
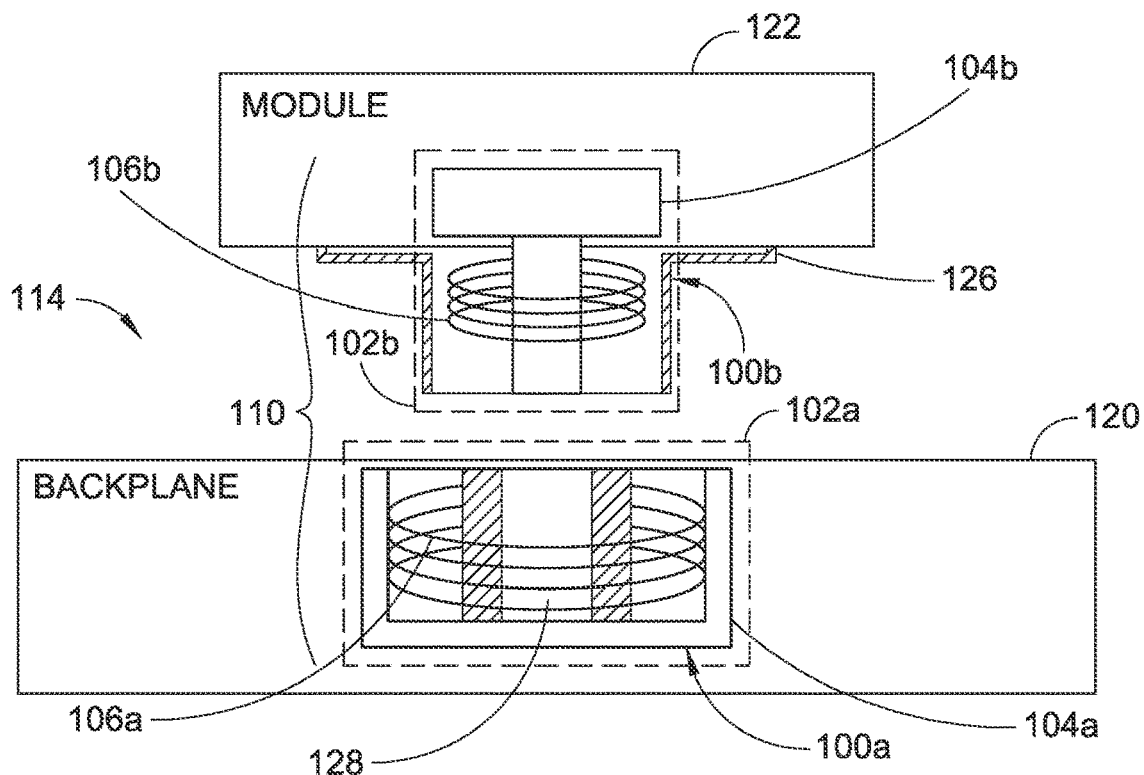
FIG. 4C is a diagrammatic illustration of a connector assembly comprising an interference core and a protective cover for coupling a module to a backplane in accordance with example implementations of the present disclosure.
Figure 4D:
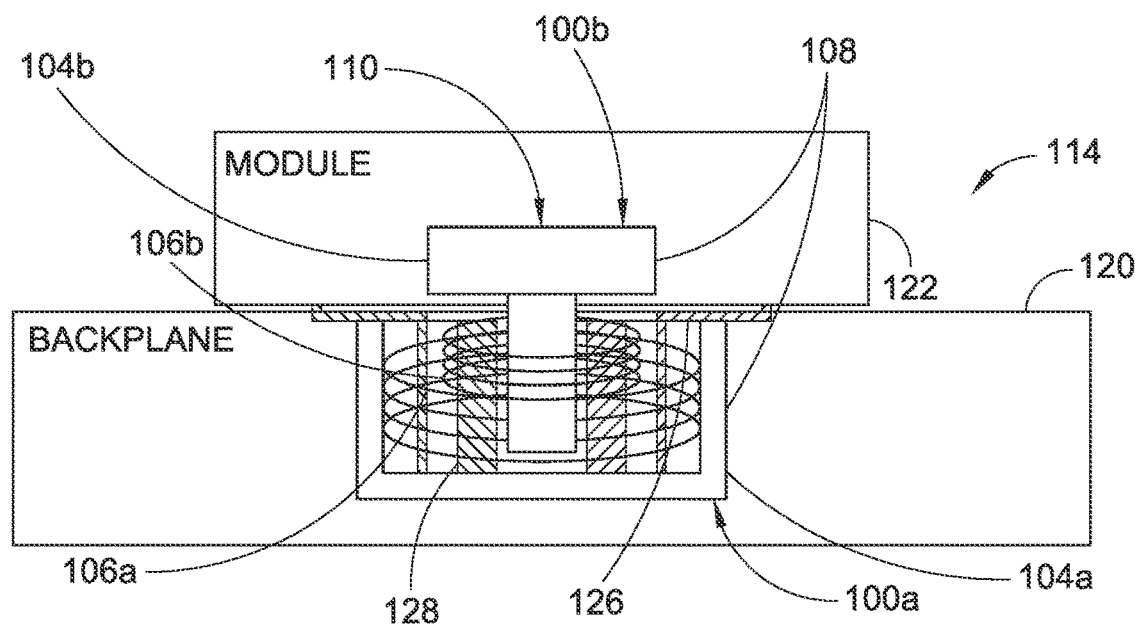
FIG. 4D is a diagrammatic illustration of the connector assembly illustrated in FIG. 4C, where electromagnetic connectors are mated to couple the module to the backplane.
Figure 5:
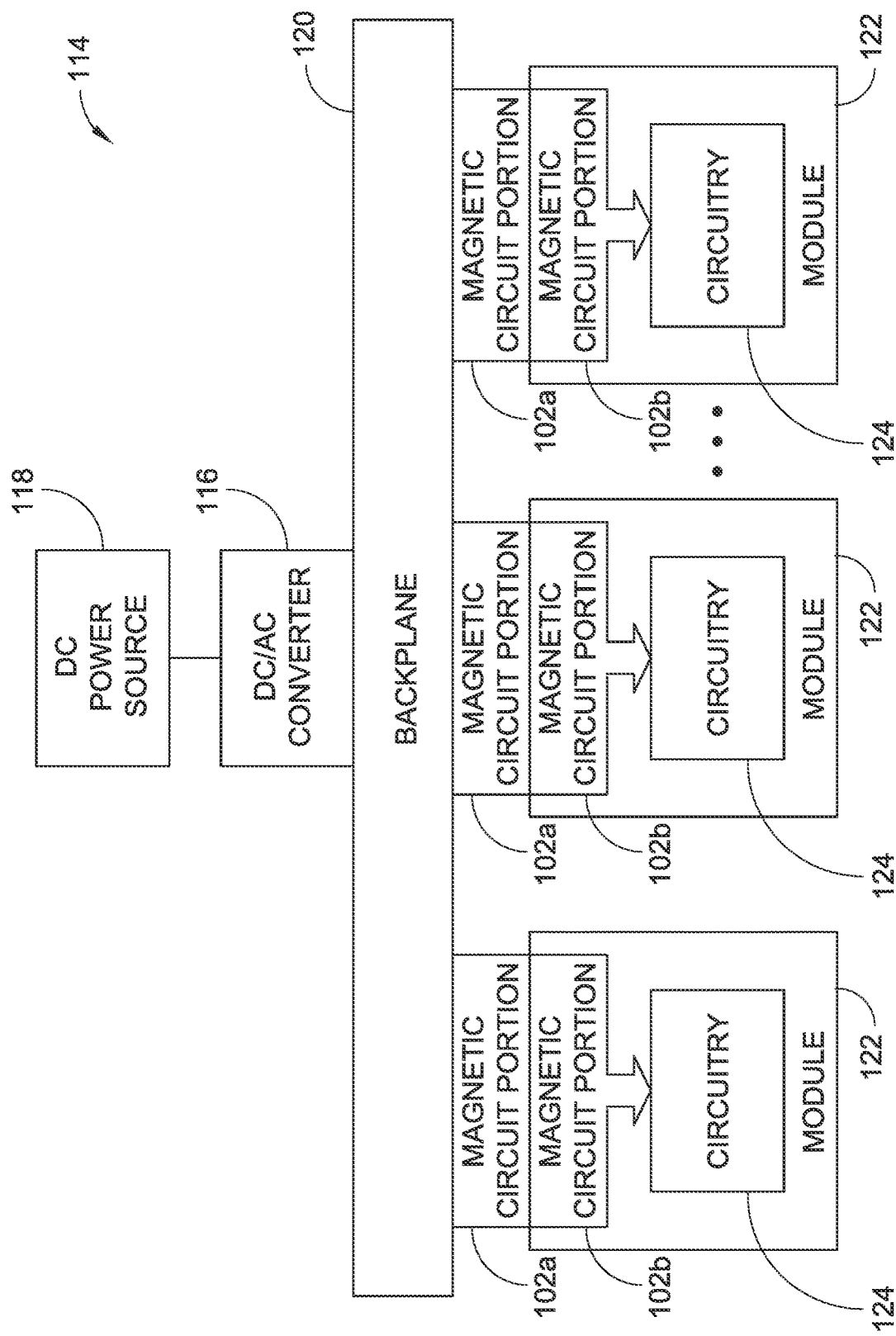
FIG. 5 is a block diagram illustrating a system for distributing power and/or communications signals along a backplane using distributed transformers implemented with electromagnetic connectors in accordance with example implementations of the present disclosure, where arrows are used to indicate power flow.
Figure 6:
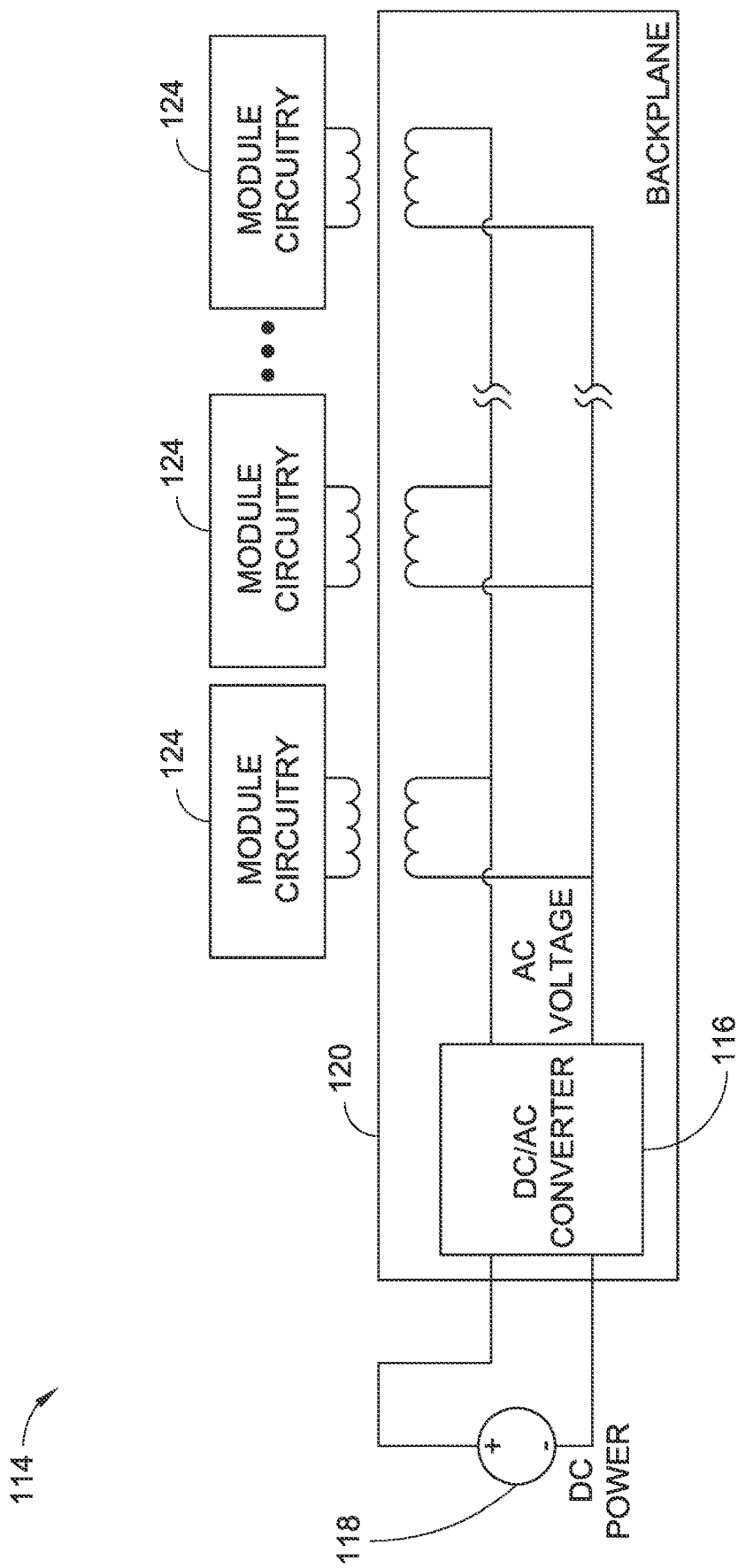
FIG. 6 is a circuit diagram of the system illustrated in FIG. 5.

Referring to FIGS. 4A through 4D, the first core member 104a may not necessarily be configured to contact the second core member 104b when the first electromagnetic connector 100a is mated with the second electromagnetic connector 100b (e.g., as shown in FIGS. 4B and 4D). Thus, an electromagnetic connector assembly 110 can be configured to transmit power and/or communications signals between components that are connected via electromagnetic connectors 100a and 100b using, for example, an interference fit configuration, e.g., as shown in FIGS. 4A through 4D, where one coil 106a is disposed around a first core portion 104a, while another coil 106b is disposed within a second core portion 104b. The interference fit may be established using connectors having geometries including, but not necessarily limited to: conical, concentric, eccentric, geometric, sloped for friction fit, and so forth.

In implementations, one or both of the core members 104a and/or 104b and/or coils 106a and/or 106b can be at least partially (e.g., fully or partially) mechanically encased within a protective layer. The protective layer may be fabricated of a non-conductive/insulating material, such as a coating of thin film plastic material. The protective layer (e.g., non-conductive/insulating material) can be applied using techniques including, but not necessarily limited to: coating, painting, deposition, and so forth. For instance, as shown in FIGS. 4C and 4D, the core member 104b and coil 106b of an electromagnetic connector 100b included within module 122 is partially enclosed by a cover 126, while an electromagnetic connector 100a included within backplane 120 includes a shaft 128 configured to mate with the cover 126. In this manner, the cover 126 and the shaft 128 may be configured to ensure proper alignment of the first electromagnetic connector 100b with the electromagnetic connector 100a, while protecting the core member 104b and/or the coil 106b of the electromagnetic connector 100b from corrosion, mechanical damage (e.g., fracture), and so forth. Encasement may be especially useful when a core member 104a and/or 104b is constructed from a brittle material. For instance, the core member 104b can be tightly encased in a protective layer formed of a plastic material. In this manner, when damage to the core member (e.g., cracks or breaks in the core member) occurs, the pieces of material can be maintained in substantial contact with one another within the casing, thus damage to the core material may not significantly decrease performance.

FIGS. 3A through 6 illustrate an example system 114 in accordance with example implementations of the present disclosure. The system 114 includes DC/AC conversion circuitry, such as DC/AC converter 116, or the like, for converting a DC signal to an AC signal. For instance, the DC signal may be supplied from a DC power source 118 and converted to an AC signal using the DC/AC converter 116. In implementations, the DC/AC converter 116 can be implemented using a PWM/PDM. However, the PWM/PDM is provided by way of example only and is not meant to be restrictive of the present disclosure. Thus, DC/AC converter 116 may be implemented using other DC/AC conversion circuitry, including, but not necessarily limited to: a voltage to frequency converter and/or a cascade topology (e.g., where two or more PWM's are connected in cascade). The system 114 also includes one or more backplanes 120, each coupled with a DC/AC converter 116 for distributing the AC signal from the DC/AC converter 116. Each backplane 120 has a number of electromagnetic connectors 100, where each one of the electromagnetic connectors 100a includes a core member 104a and a coil 106a disposed of the core member 104a (e.g., as previously described). Each one of the electromagnetic connectors 100a included with a backplane 120 is configured to mate with another electromagnetic connector 100b that can be included with, for example, modules 122, and so forth.

When the electromagnetic connectors 100a and 100b are mated, a core member 104a of the backplane 120 and a core member 104b of a module 122 are configured to couple the coils 106a and 106b via magnetic circuit 108. The magnetic circuit 108 is configured to induce a signal in coil 106b of module 122 when coil 106a of backplane 120 is energized (e.g., with the AC signal from DC/AC converter 116). The signal induced in coil 106b of module 122 may be used to power and/or furnish communications with circuitry 124 of module 122. It should be noted that while backplane 120 is described as inducing a signal in module 122, this implementation is provided by way of example only and is not meant to be restrictive of the present disclosure. Thus, the magnetic circuit 108 can also be used to induce a signal in a coil 106a of backplane 120 when a coil 106b of module 122 is energized to power and/or furnish communications with backplane 120. Further, the coils included with mating electromagnetic connectors may be energized in an alternating sequence (e.g., one after another) to provide bidirectional communication, and so forth.

Figure 7:
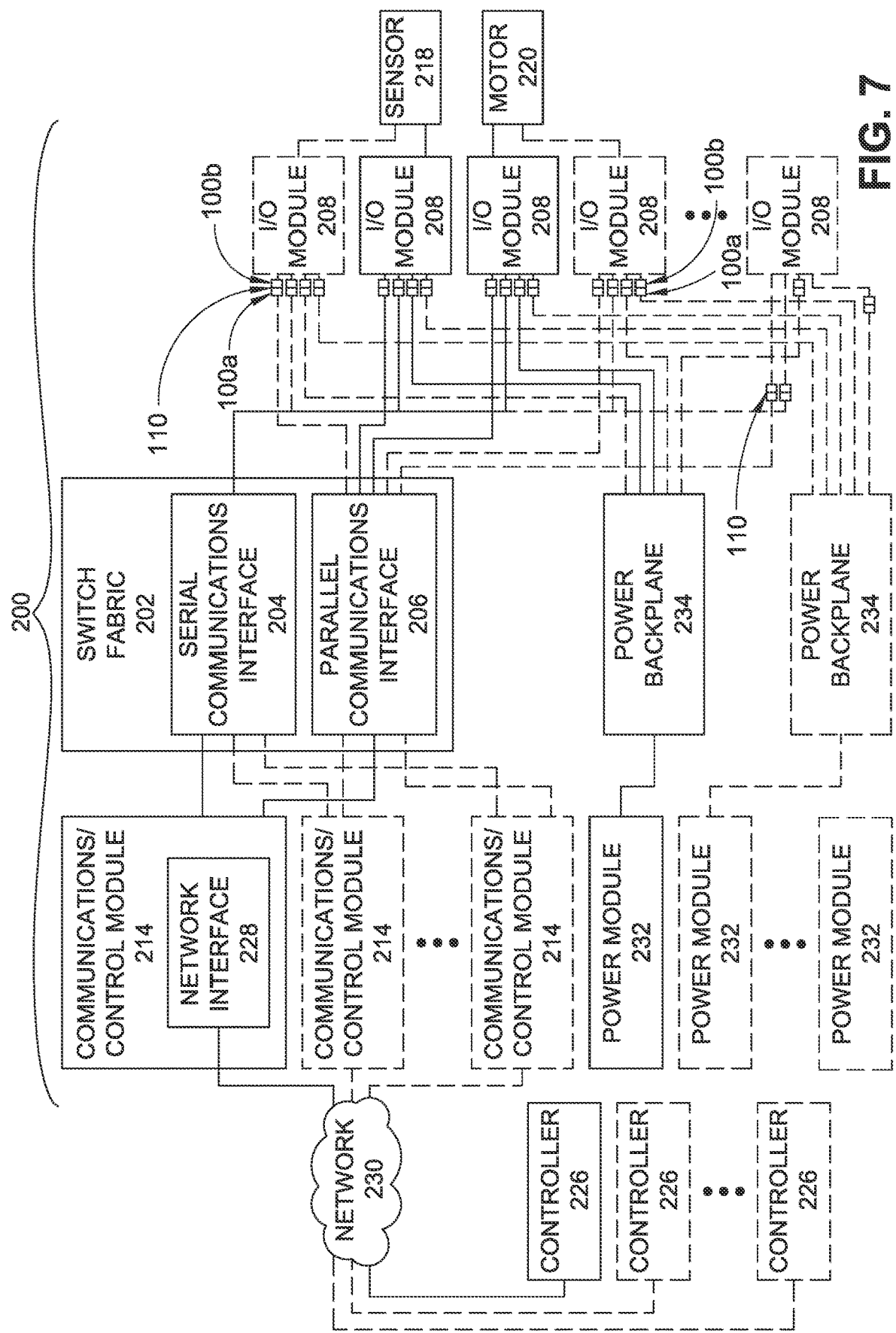
FIG. 7 is a block diagram illustrating a communications control system in accordance with example implementations of the present disclosure.
Figure 14:
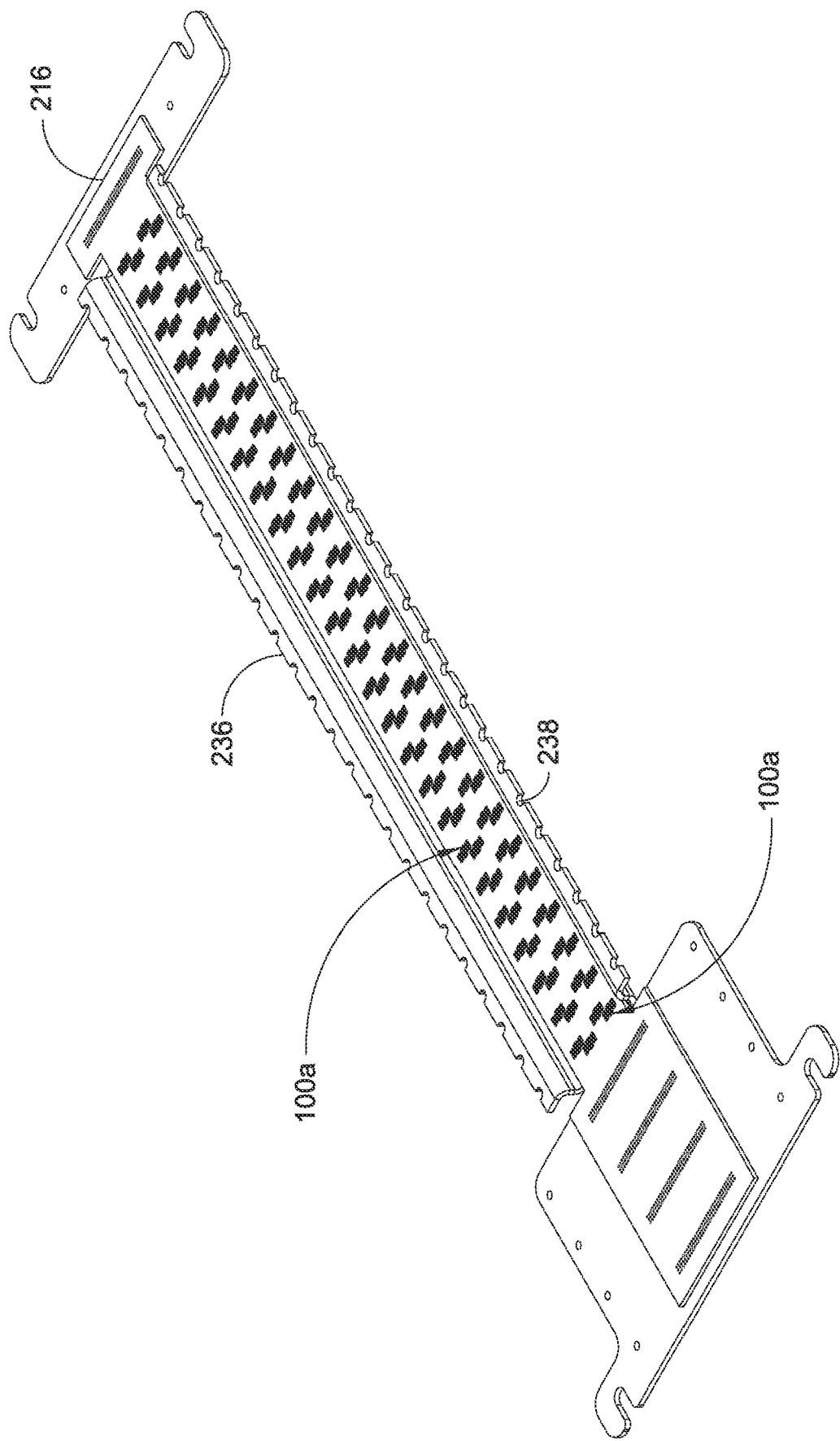
FIG. 14 is an isometric view illustrating a support frame with an attached circuit board for the communications control system illustrated in FIG. 9.

FIGS. 7 through 14 illustrate an example communications control system 200 in accordance with the present disclosure. In implementations, the communications control system 200 may be configured for use with process control systems technology, and so forth. For example, the communications control system 200 may be used with a distributed control system comprised of controller elements and subsystems, where the subsystems are controlled by one or more controllers distributed throughout the system. The communications control system 200 includes a switch fabric 202 comprising a serial communications interface 204 and a parallel communications interface 206 for furnishing communications with a number of I/O modules 208. As shown in FIGS. 7 and 14, the I/O modules 208 can be connected to the communications control system 200 using one or more electromagnetic connectors 100a and 100b (e.g., as shown and described with reference to FIGS. 2 through 6). For instance, each I/O module 208 can include one or more connectors 100b/connector assemblies 110, with core members extending through coils.

Figure 2:
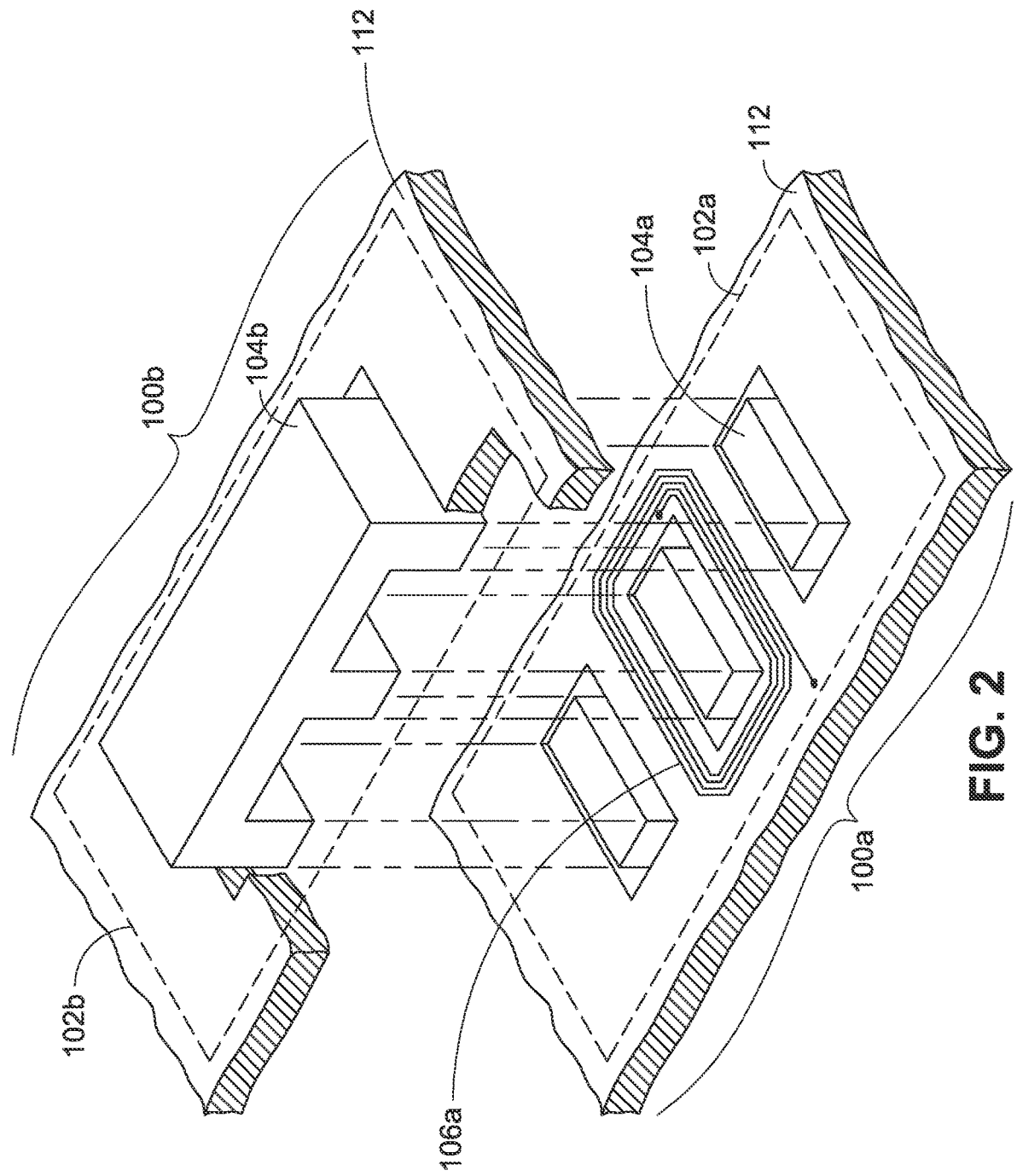
FIG. 2 is a partial cross-sectional isometric view illustrating electromagnetic connectors in accordance with example implementations of the present disclosure.

As shown in FIG. 2, the coils can be implemented as planar windings on a circuit board. When included in a module 208, the circuit board can be "floated" against a partial spring load, allowing for some movement of the circuit board perpendicular to the plane of a core member, e.g., to compensate for tolerances across the circuit board. For example, a self-holding spring loading mechanism can be provided in the module to provide a constant downward pressure to facilitate mating of the electromagnetic connection, compensating for stacked tolerances of the module, PCB, and baseplate/support frame and ensuring a constant mating of both halves of an electromagnetic connector assembly. In a particular implementation, a "tongue and groove" configuration can be used that provides inherent fastening and support in three planes. For example, a printed circuit board included within an I/O module 208 can be configured to slide along and between two track segments in a direction perpendicular to the plane of a core member. Further, a core member can be mechanically isolated from (e.g., not touching) the circuit board. It should be noted that the implementation with planar primary and secondary windings described with reference to FIG. 2 is provided by way of example only and is not necessarily meant to be restrictive of the present disclosure. Thus, other implementations can use other coil configurations, such as wire wound coils, and so forth. For example, the primary coil may comprise a planar winding, and the secondary coil may comprise a wire wound coil. Further, the primary coil may comprise a wire wound coil, and the secondary coil may comprise a planar winding. In other implementations, primary and secondary coils may both comprise wire wound coils.

The serial communications interface 204 may be implemented using a group of connectors connected in parallel with one another. In one or more implementations, the connectors may be configured as electromagnetic connectors 100a and/or 100b/connector assemblies 110 (e.g., as previously described). For example, the serial communications interface 204 may be implemented using a multidrop bus 210, or the like. In implementations, the multidrop bus 210 may be used for configuration and diagnostic functions of the I/O modules 208. The parallel communications interface 206 allows multiple signals to be transmitted simultaneously over multiple dedicated high speed parallel communication channels. For instance, the parallel communications interface 206 may be implemented using a cross switch 212, or the like.

Figure 8:
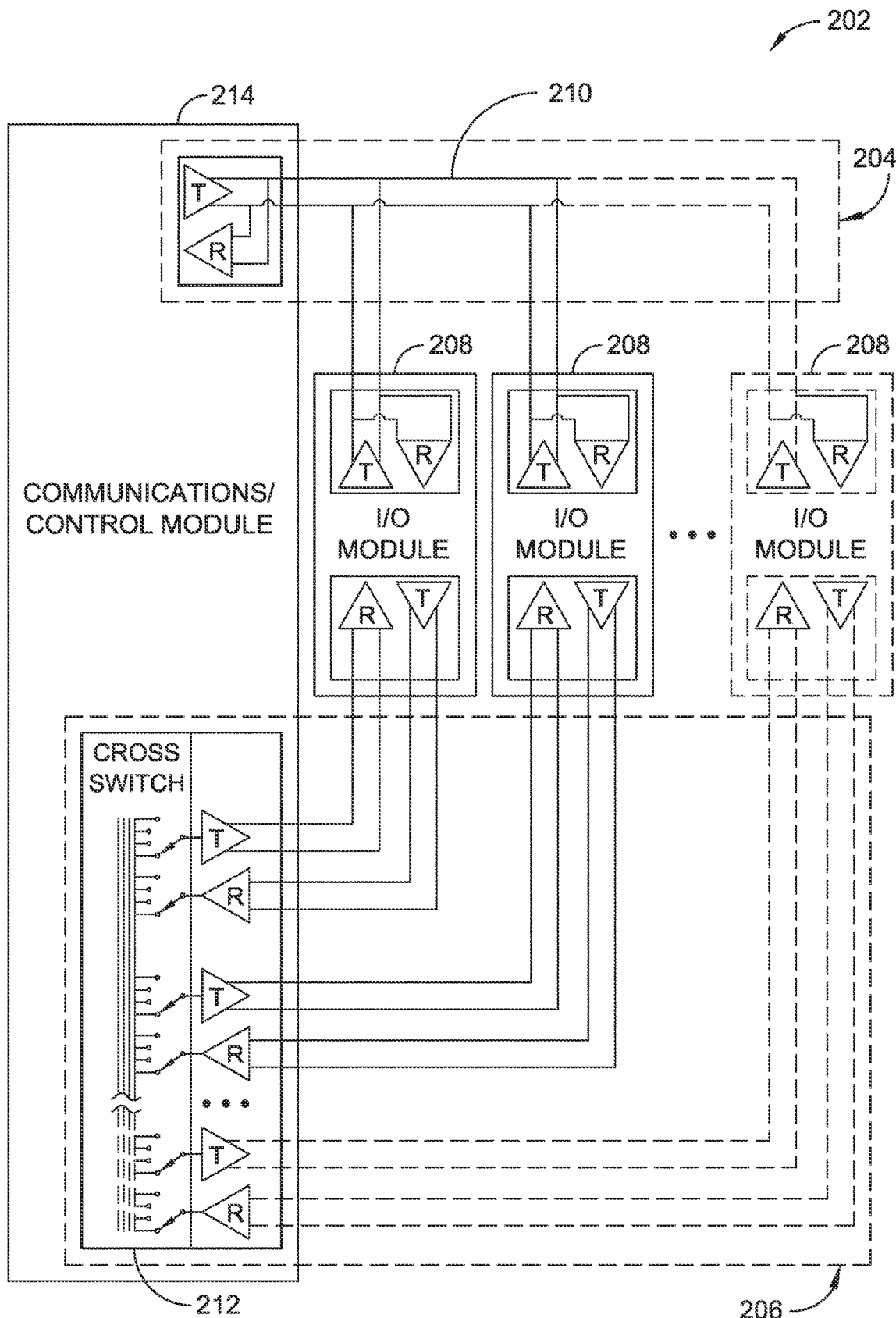
FIG. 8 is a circuit diagram illustrating a switch fabric for a communications control system in accordance with example implementations of the present disclosure.
Figure 9:
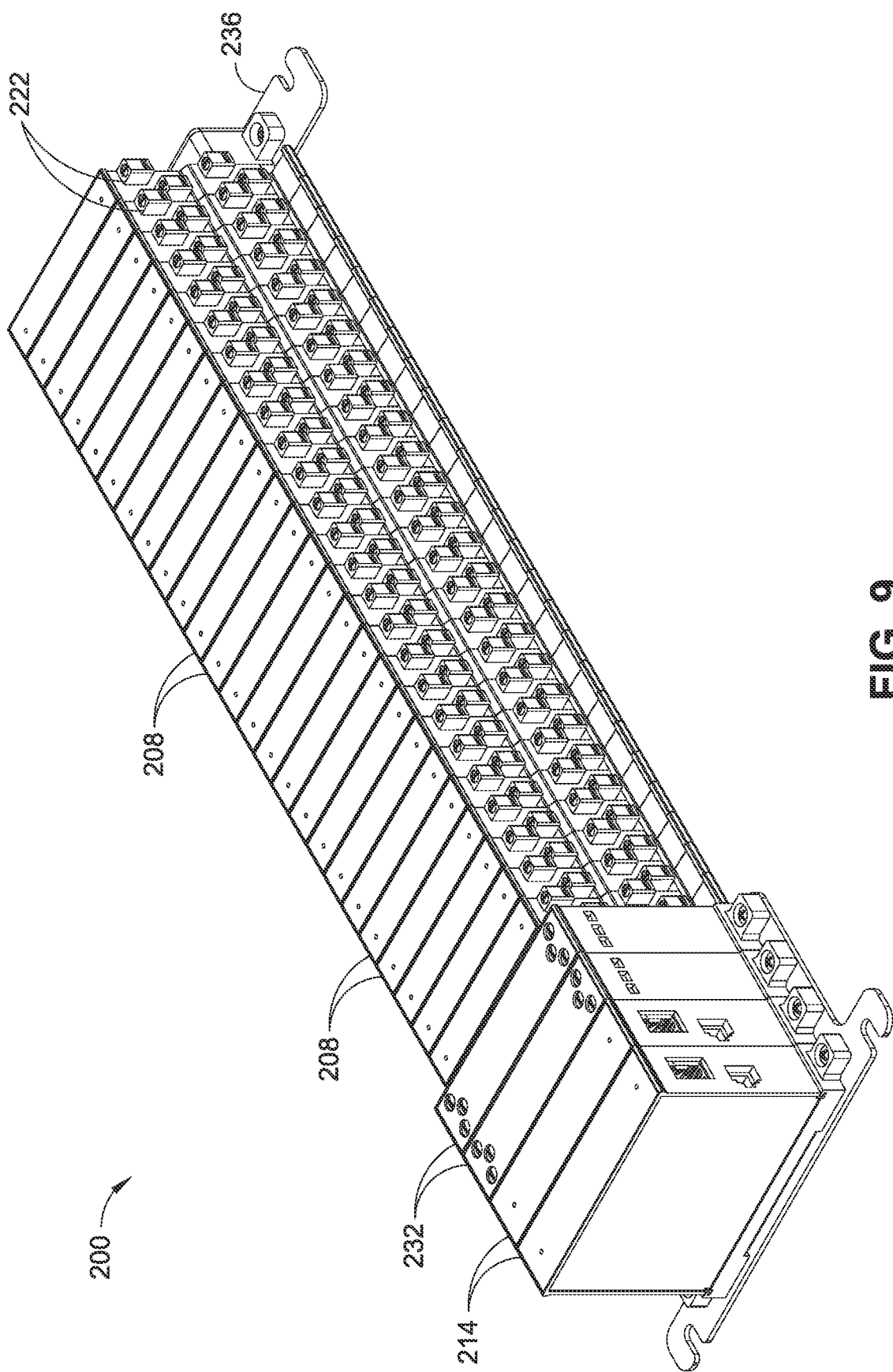
FIG. 9 is an isometric view illustrating a communications control system in accordance with example implementations of the present disclosure.
Figure 10:
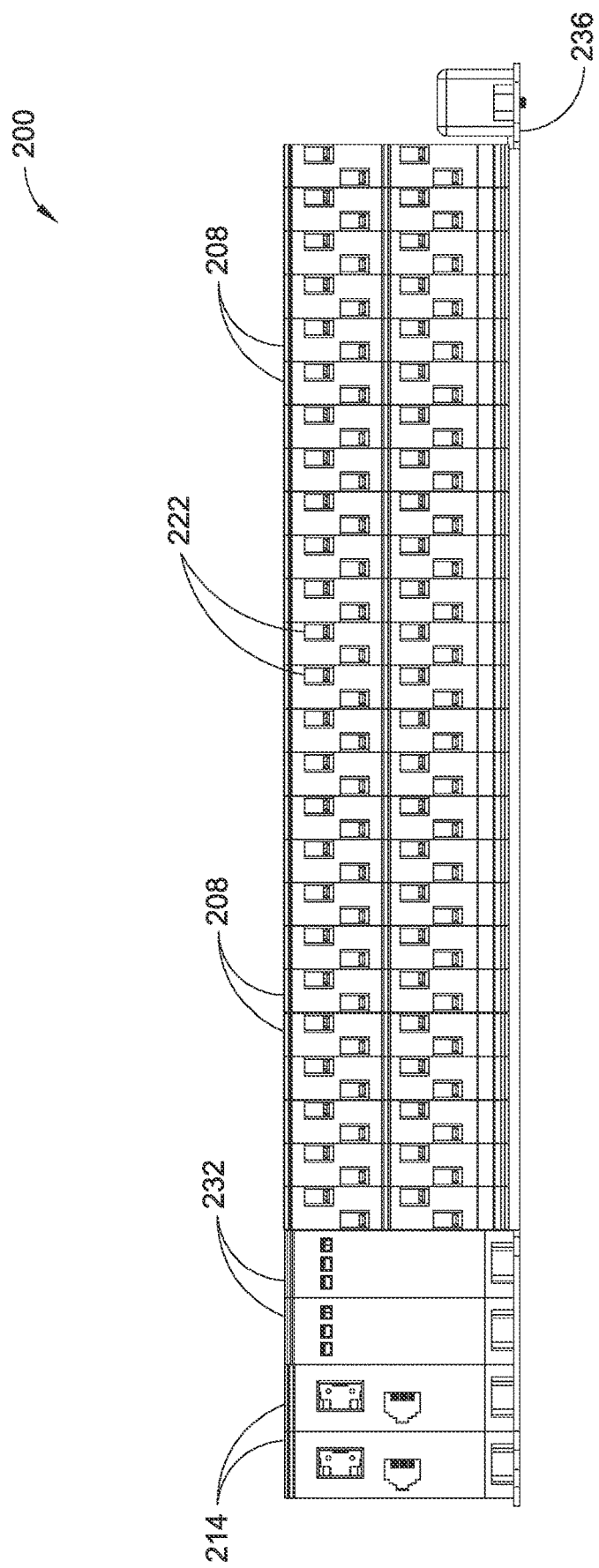
FIG. 10 is a side elevation view of the communications control system illustrated in FIG. 9.
Figure 11:
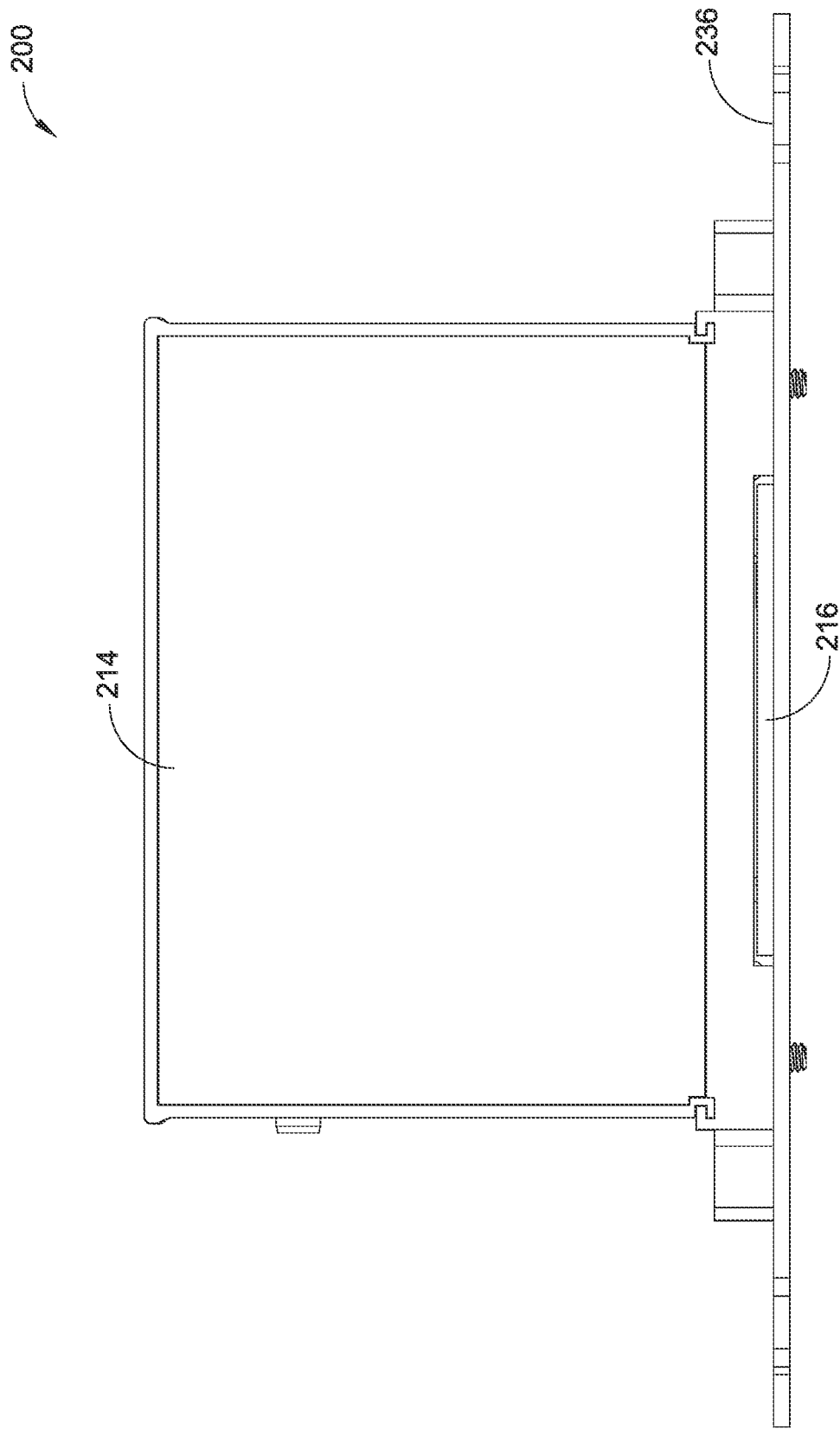
FIG. 11 is an end view of the communications control system illustrated in FIG. 9.
Figure 12:
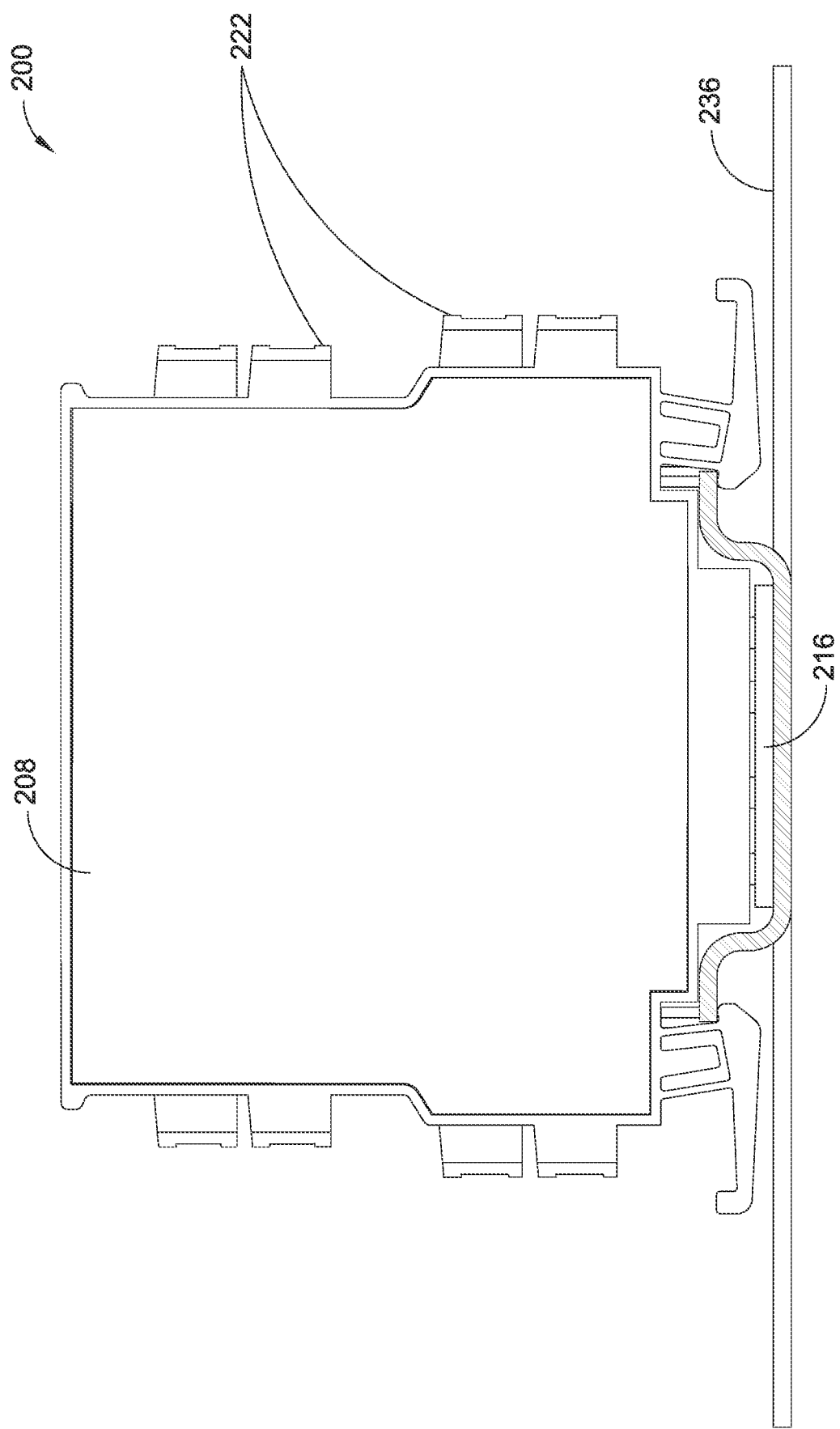
FIG. 12 is a partial cross-sectional end view of the communications control system illustrated in FIG. 9.
Figure 13:
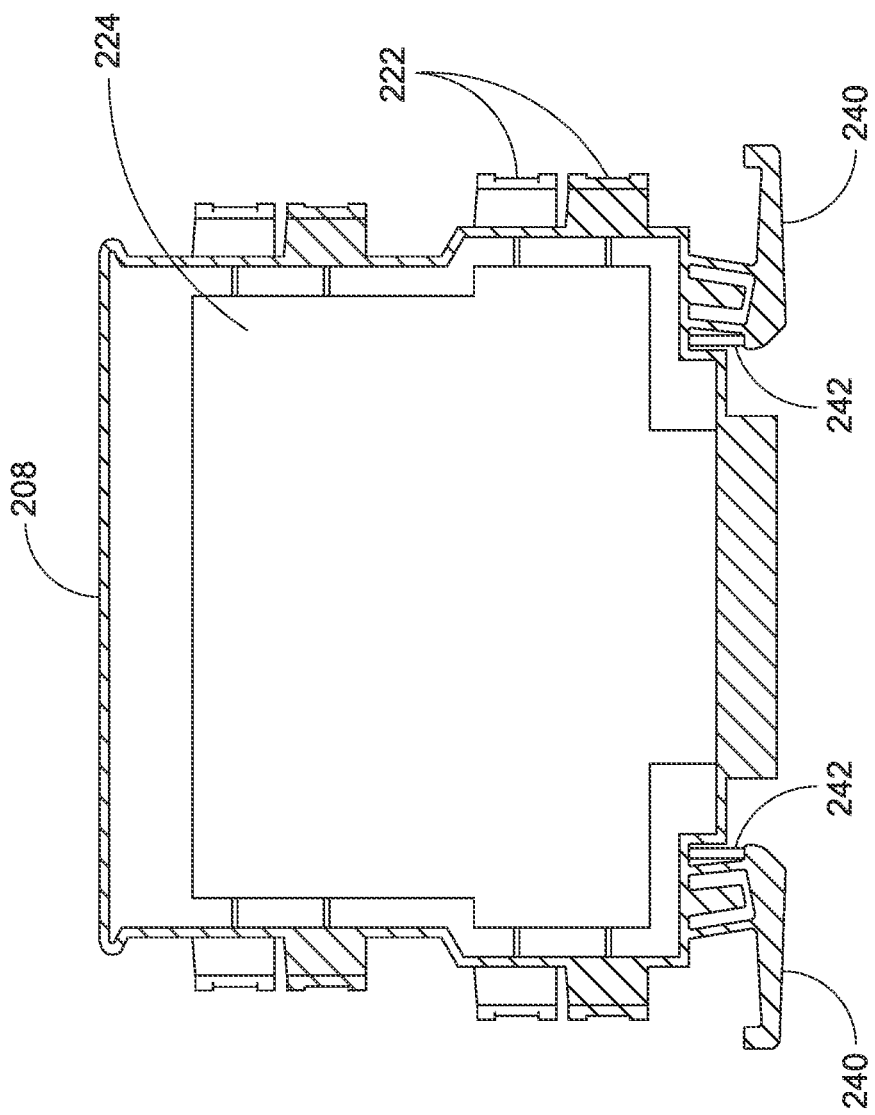
FIG. 13 is a cross-sectional end view illustrating an input/output module for the communications control system illustrated in FIG. 9.

In a particular implementation, as described in FIG. 8, the parallel communications interface 206 can be implemented using a four (4) wire full duplex cross switch 212 with a dedicated connection to each I/O module 208. In implementations, each connection may be furnished using one or more electromagnetic connectors 100a and/or 100b/connector assemblies 110 (e.g., as previously described). The cross switch 212 can be implemented as a programmable cross switch connecting point-to-point busses and allowing traffic between the I/O modules 208. The cross switch 212 may be configured by a master device, such as a communications/control module 214. For example, a communications/control module 214 may configure one or more sets of registers included in the cross switch 212 to control traffic between the I/O modules 208. In implementations, a communications/control module 214 may comprise a rule set dictating how the I/O modules 208 are interconnected. For example, a communications/control module 214 may comprise a set of registers, where each register defines the operation of a particular switch (e.g., with respect to how packets are forwarded, and so forth). Thus, the cross switch 212 may not necessarily auto-configure, instead implementing a configuration provided by a communications/control module 214. However, this configuration is provided by way of example only and is not meant to be restrictive of the present disclosure. Thus, in other implementations, the cross switch 212 may auto-configure.

The parallel communications interface 206 may be used for data collection from the I/O modules 208. Further, because each I/O module 208 has its own private bus to the master (e.g., communications/control modules 214), each I/O module 208 can communicate with the master at the same time. Thus, the total response time for the communications control system 200 may be limited to that of the slowest/O module 208, instead of the sum of all slave devices.

In implementations, the switch fabric 202, the serial communications interface 204, and the parallel communications interface 206 may be implemented in a single, monolithic circuit board 216, e.g., with multiple E-shaped core members of electromagnetic connectors 100a extending through the circuit board 216, as shown in FIG. 14. In implementations, the core members may be mechanically isolated from the circuit board 216 (e.g., not touching the circuit board 216). However, this configuration is provided by way of example only and is not meant to be restrictive of the present disclosure. Thus, the serial communications interface 204 and the parallel communications interface 206 may be implemented using different arrangements of multiple components, such as multiple discrete semiconductor devices for implementing the serial communications interface 204 and the parallel communications interface 206 separately, and so forth.

The switch fabric 202 may be configured for connecting one or more I/O modules 208 and transmitting data to and from the I/O modules 208. The I/O modules 208 may comprise input modules, output modules, and/or input and output modules. For instance, input modules can be used to receive information from input instruments in the process or the field, while output modules can be used to transmit instructions to output instruments in the field. For example, an I/O module 208 can be connected to a process sensor, such as a sensor 218 for measuring pressure in piping for a gas plant, a refinery, and so forth. In implementations, the I/O modules 208 may be used to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

In implementations, the I/O module 208 may be configured to convert analog data received from the sensor 218 to digital data (e.g., using Analog-to-Digital Converter (ADC) circuitry, and so forth). An I/O module 208 may also be connected to a motor 220 and configured to control one or more operating characteristics of the motor 220, such as motor speed, motor torque, and so forth. Further, the I/O module 208 may be configured to convert digital data to analog data for transmission to the motor 220 (e.g., using Digital-to-Analog (DAC) circuitry, and so forth). In implementations, one or more of the I/O modules 208 may comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more of the I/O modules 208 can be used to provide fault tolerant and redundant connections for a communications sub-bus.

Each I/O module 208 may be provided with a unique identifier (ID) for distinguishing one I/O module 208 from another I/O module 208. In implementations, an I/O module 208 may be identified by its ID when it is connected to the communications control system 200. Multiple I/O modules 208 can be used with the communications control system 200 to provide redundancy. For example, two or more I/O modules 208 can be connected to the sensor 218 and/or the motor 220, as described in FIG. 7. Each I/O module 208 can include one or more ports 222 furnishing a physical connection to hardware and circuitry included with the I/O module 208, such as a Printed Circuit Board (PCB) 224, and so forth.

One or more of the I/O modules 208 may include an interface for connecting to other networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 208 may include a connection for connecting an I/O module 208 to a computer bus, and so forth.

The switch fabric 202 may be coupled with one or more communications/control modules 214 for monitoring and controlling the I/O modules 208, and for connecting the I/O modules 208 together. The communications/control module(s) 214 may be used to configure the cross switch 212. For example, a communications/control module 214 may update a routing table when an I/O module 208 is connected to the communications control system 200 based upon a unique ID for the I/O module 208. Further, when multiple redundant I/O modules 208 are used, each communications/control module 214 can implement mirroring of informational databases regarding the I/O modules 208 and update them as data is received from and/or transmitted to the I/O modules 208. In some implementations, two or more communications/control modules 214 may be used to provide redundancy.

Data transmitted using the switch fabric 202 may be packetized, i.e., discrete portions of the data may be converted into data packets comprising the data portions along with network control information, and so forth. The communications control system 200 may use one or more protocols for data transmission, including a bit-oriented synchronous data link layer protocol such as High-Level Data Link Control (HDLC). In a specific instance, the communications control system 200 may implement HDLC according to an International Organization for Standardization (ISO) 13239 standard, or the like. Further, two or more communications/control modules 214 can be used to implement redundant HDLC. However, it should be noted that HDLC is provided by way of example only and is not meant to be restrictive of the present disclosure. Thus, the communications control system 200 may use other various communications protocols in accordance with the present disclosure.

One or more of the communications/control modules 214 may be configured for exchanging information with components used for monitoring and/or controlling the instrumentation connected to the switch fabric 202 via the I/O modules 208, such as one or more control loop feedback mechanisms/controllers 226. In implementations, a controller 226 can be configured as a microcontroller/Programmable Logic Controller (PLC), a Proportional-Integral-Derivative (PID) controller, and so forth. One or more of the communications/control modules 214 may include a network interface 228 for connecting the communications control system 200 to a controller 226 via a network 230. In implementations, the network interface 228 may be configured as a Gigabit Ethernet interface for connecting the switch fabric 202 to a Local Area Network (LAN). Further, two or more communications/control modules 214 can be used to implement redundant Gigabit Ethernet. However, it should be noted that Gigabit Ethernet is provided by way of example only and is not meant to be restrictive of the present disclosure. Thus, the network interface 228 may be configured for connecting the communications control system 200 to other various networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Additionally, the network interface 228 may be implemented using computer bus. For example, the network interface 228 can include a Peripheral Component Interconnect (PCI) card interface, such as a Mini PCI interface, and so forth. Further, the network 230 may be configured to include a single network or multiple networks across different access points.

The communications control system 200 may include one or more power modules 232 for supplying electrical power to field devices via the I/O modules 208. One or more of the power modules 232 may include an AC-to-DC (AC/DC) converter for converting Alternating Current (AC) (e.g., as supplied by AC mains, and so forth) to Direct Current (DC) for transmission to a field device, such as the motor 220 (e.g., in an implementation where the motor 220 comprises a DC motor). Two or more power modules 232 can be used to provide redundancy. For example, as shown in FIG. 7, two power modules 232 can be connected to each of the I/O modules 208 using a separate (redundant) power backplane 234 for each power module 232. One or more of the power backplanes 234 can be implemented in the manner of the backplane 120 described with reference to FIGS. 3A through 6. In implementations, power backplane 234 may be connected to one or more of the I/O modules 208 using electromagnetic connectors 100a and 100b/connector assemblies 110 (e.g., as previously described). In implementations, power backplane 234 may be included with circuit board 216, along with serial communications interface 204 and parallel communications interface 206. Power backplane 234 may include a PWN, and may be configured in the manner of backplane 120 as shown in FIGS. 3A through 6.

The communications control system 200 may be implemented using a support frame 236. The support frame 236 may be used to support and/or interconnect the communications/control module(s) 214, the power module(s) 232, the switch fabric 202, the power backplane(s) 234, and/or the I/O modules 208. The circuit board 216 may be mounted to the support frame 236 using a fastener such as, for example, double sided tape, adhesive, or mechanical fasteners (e.g., screws, bolts, etc.). Additionally, the core members of the electromagnetic connectors 100a may be mounted to the support frame 236 using a fastener such as, for example, double sided tape, adhesive, or mechanical fasteners (e.g., screws, bolts, etc.). In some implementations, a template may be used to position the core members in the channel of the support frame 236. In implementations, the top surface of a core member may be substantially flush with a top surface of the circuit board 216. In other implementations, the top surface of a core member may be recessed some distance below a top surface of the circuit board 216 (e.g., by about one millimeter (1 mm)) and/or may extend above a top surface of the circuit board 216.

The support frame 236 may include slots 238 to provide registration for the I/O modules 208, such as for aligning connectors 100b of the I/O modules 208 with connectors 100a included with the circuit board 216 and/or connectors 100a of a power backplane 234. For example, an I/O module 208 may include connectors 240 having tabs/posts 242 for inserting into slots 238 and providing alignment of the I/O module 208 with respect to the circuit board 216. In implementations, one or more of the connectors 240 may be constructed from a thermally conductive material (e.g., metal) connected to a thermal plane of PCB 224 to conduct heat generated by components of the PCB 224 away from the PCB 224 and to the support frame 236, which itself may be constructed of a thermally conductive material (e.g., metal). Further, the communications control system 200 may associate a unique physical ID with each physical slot 238 to uniquely identify each I/O module 208 coupled with a particular slot 238. For example, the ID of a particular slot 238 can be associated with an I/O module 208 coupled with the slot 238 and/or a second ID uniquely associated with the I/O module 208. Further, the ID of a particular I/O module 208 can be used as the ID for a slot 238 when the I/O module 208 is coupled with the slot 238. The support frame 236 can be constructed for cabinet mounting, rack mounting, wall mounting, and so forth.

It should be noted that while the communications control system 200 is described in the accompanying figures as including one switch fabric 202, more than one switch fabric 202 may be provided with communications control system 200. For example, two or more switch fabrics 202 may be used with the communications control system 200 (e.g., to provide physical separation between redundant switch fabrics 202, and so forth). Each one of the switch fabrics 202 may be provided with its own support frame 236. Further, while both the serial communications interface 204 and the parallel communications interface 206 are described as included in a single switch fabric 202, it will be appreciated that physically separate switch fabrics may be provided, where one switch fabric includes the serial communications interface 204, and another switch fabric includes the parallel communications interface 206.

Example Process

Referring now to FIG. 15, example techniques for forming electromagnetic connectors and mating the electromagnetic connectors are described.

FIG. 15 depicts a process 1500, in an example implementation, for forming one or more electromagnetic connectors, such as the electromagnetic connectors 100a and/or 100b/connector assemblies 110 illustrated in FIGS. 2 through 14 and described above, and mating the electromagnetic connectors. In the process 1500 illustrated, a first electromagnetic connector is provided, where the first electromagnetic connector is configured to form a first magnetic circuit portion (Block 1510). The first magnetic circuit portion may, for instance, be constructed by providing a first core member (Block 1512) and providing a first coil disposed of the first core member (Block 1514). For example, with reference to FIGS. 2 through 14, a coil 106a is formed around or within a core member 104a to form a magnetic circuit portion 102a of an electromagnetic connector 100a. In implementations, the coil 106a may be comprised of planar windings, which may be printed on and/or embedded in a circuit board 112, as illustrated in FIG. 2. However, planar windings are provided by way of example only and are not meant to be restrictive of the present disclosure. Thus, a coil 106a may comprise other windings, such as insulated copper windings wrapped around or within a core member 104a, and so forth.

One or more core members 104a and/or 104b of the electromagnetic connectors 100a and/or 100b may be formed from an iron slurry material. However, this material is provided by way of example only and is not meant to be restrictive of the present disclosure. Thus, a core member 104a and/or 104b may comprise any material having a magnetic permeability suitable for confining and guiding magnetic fields generated by a coil 106a and/or 106b, including, but not necessarily limited to: soft magnetic materials (i.e., magnetic materials with low hysteresis, such as silicon steel), ferromagnetic metals (e.g., iron), ferrimagnetic compounds (e.g., ferrites), and so forth.

While the core members 104a and/or 104b are shown as E-shaped in the accompanying figures, this particular shape is provided by way of example only and is not meant to be restrictive of the present disclosure. Thus, a core member 104a and/or 104b and/or the combined form of two mating core members 104a and 104b may comprise other shapes and/or core geometries, including, but not necessarily limited to: a straight cylindrical rod-shaped core, an "I" core, a "C"/"U" core, an "EFD" core, an "EP" core, an "ER" core, a pot core, a toroidal core, a ring/bead core, and so forth. For example, the shape of a core member 104a and/or 104b may be selected based upon a coupling/operating frequency. Further, a core member 104a and/or 104b can be implemented as a planar core (e.g., with a planar winding). In implementations, the core member 104a and/or 104b may be formed in or on a circuit board, e.g., along with a coil 106a and/or 106b formed as a planar winding, such that the core member 104a and/or 104b is electrically insulated from the coil 106a and/or 106b by one or more portions of the circuit board.

In implementations where one core member 104a or 104b is configured to contact another core member 104a or 104b, the contact surfaces may be substantially flat (e.g., as illustrated in FIG. 2), but this configuration is provided by way of example only and is not meant to limit the present disclosure. Thus, other implementations may be provided, including implementations designed to increase the surface area of contact between core members and/or to provide self-alignment of the core members (e.g., by configuring a portion of one core member for insertion into another core member). For example, one core member may comprise a tapered pin configured for insertion into a tapered hole of another core member, where the outside periphery and/or an end of the tapered pin is configured to contact a portion of the interior wall and/or a bottom surface of the tapered hole.

One or more gaps may be provided between various points of a particular pair of mating core members 104a and 104b. For example, as illustrated in FIGS. 3A and 3B, when an E-shaped core member 104a and/or 104b is used, an air gap $A_G$ may be provided by shortening/truncating a middle leg of the E-shape. For example, one portion of the middle leg of the "E" may be fixedly connected to a core member 104b, while another portion of the middle leg of the "E" may be supported proximal to, but not necessarily in electrical contact with, a core member 104a (e.g., as shown in FIGS. 3A and 3B). In this type of implementation, the portion of the middle leg of the "E" for the core member 104a may be supported proximal to the core member 104a using, for example, an insulating material. Further, an air gap may be provided by mating an E-shaped core member 104a or 104b with a C-shaped core member, a U-shaped core member, an I-shaped core member, and so forth. For example, the middle leg of one E-shaped core member can be configured to extend through both a first circuit board with a first coil comprising a planar winding, and a second circuit board with second coil comprising a planar winding, where the outer legs of the E-shaped core member are configured to contact the legs of another U-shaped core member. In this type of configuration, the coil disposed of the U-shaped core member can be positioned between the legs of the "U."

In one or more implementations, a second electromagnetic connector may be formed, where the second electromagnetic connector is configured to form a second magnetic circuit portion (Block 1512). The second magnetic circuit portion may be constructed by providing a second core member (Block 1522) and providing a second coil portion disposed of the second core member (Block 1524). For instance, with continuing reference to FIGS. 2 through 14, a coil 106b is formed around or within a core member 104b to form a magnetic circuit portion 102b of an electromagnetic connector 100b, as previously described. Then, the first electromagnetic connector may be mated with the second electromagnetic connector (Block 1530) to couple the first coil to the second coil with a magnetic circuit formed from the first magnetic circuit portion and the second magnetic circuit portion (Block 1532). For example, with reference to FIG. 2, a core member 104a of a first electromagnetic connector 100a of a connector assembly 110 may be placed in contact with another core member 104h of a second electromagnetic connector 100h of the connector assembly 110 to tightly couple a coil 106a included with the first electromagnetic connector 100a with another coil 106b included with the second electromagnetic connector 100t. Then, power and/or communications signals may be transmitted by energizing one of the coils 106a or 106b to induce a signal in the other coil 106a or 106b.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A backplane comprising:
   a substrate defining a plurality of apertures therethrough;
   a plurality of electromagnetic connectors at the apertures of the substrate, each one of the plurality of electromagnetic connectors configured to form a first magnetic circuit portion,
   each electromagnetic connector configured to mate with a second electromagnetic connector of a module to couple the module with the backplane, the second electromagnetic connector configured to form a second magnetic circuit portion, the first magnetic circuit portion and the second magnetic circuit portion configured to form a magnetic circuit when the electromagnetic connector is mated with the second electromagnetic connector and maintain isolation between the module and the backplane.

2. The backplane as recited in claim 1, wherein the magnetic circuit is configured for at least one of a communications signal or a power signal.

3. The backplane as recited in claim 1, further comprising a cover for at least partially enclosing at least one of the plurality of electromagnetic connectors.

4. The backplane as recited in claim 1, wherein at least one of the plurality of electromagnetic connectors comprises a planar winding disposed on the substrate.

5. The backplane as recited in claim 1, wherein at least one of the plurality of electromagnetic connectors comprises an E-shaped core member.

6. The backplane as recited in claim 1, wherein the magnetic circuit comprises an air gap.

7. A system comprising:
a substrate comprising a plurality of electromagnetic connectors, each one of the plurality of electromagnetic connectors comprising a first electromagnetic connector comprising a first core member and a first coil disposed about the first core member, the substrate defining an aperture therethrough, the first core member extending through the aperture defined by the substrate; and
a module comprising a second electromagnetic connector comprising a second core member and a second coil disposed about the second core member, the second coil comprising a wound coil, each respective first core member of the plurality of electromagnetic connectors and the second core member configured to couple the first coil to the second coil to form a magnetic circuit when the first electromagnetic connector is mated with the second electromagnetic connector, the magnetic circuit configured to induce a signal in the second coil when the first coil is energized while maintaining isolation between the module and the substrate.

8. The system as recited in claim 7, wherein the signal induced in the second coil comprises at least one of a communications signal or a power signal.

9. The system as recited in claim 7, wherein the first core member is configured to provide alignment with the second core member when the first electromagnetic connector is mated with the second electromagnetic connector.

10. The system as recited in claim 7, wherein the first coil comprises a planar winding.

11. The system as recited in claim 7, wherein the first core member comprises an E-shaped core member.

12. The system as recited in claim 7, wherein the magnetic circuit formed from the first core member and the second core member comprises an air gap.

13. A system comprising:
a backplane for distributing an electrical signal, the backplane configured to provide bidirectional communications; and
a plurality of electromagnetic connectors coupled with the backplane, each electromagnetic connector configured to mate with a second electromagnetic connector of a module to couple the module with the backplane to form a magnetic circuit and provide bidirectional communications between the backplane and the module while maintaining isolation between the module and the backplane.

14. The system as recited in claim 13, further comprising Direct Current (DC)-to-Alternating Current (AC) (DC/AC) conversion circuitry coupled with the backplane for converting a DC signal to an AC signal distributed via the backplane.

15. The system as recited in claim 14, wherein the DC/AC conversion circuitry comprises Pulse-Width Modulation (PWM) circuitry.

16. The system as recited in claim 13, further comprising:
a plurality of modules configured to at least one of transmit or receive data;
a serial communications interface configured for connecting the plurality of modules in parallel; and
a parallel communications interface configured to individually connect the plurality of modules.

17. The system as recited in claim 16, wherein at least one of the plurality of modules comprises the second electromagnetic connector, and at least one of the serial communications interface or the parallel communications interface is connected to the at least one of the plurality of modules by mating the second electromagnetic connector with the electromagnetic connector.

18. The system as recited in claim 16, wherein the serial communications interface comprises a multidrop bus.

19. The system as recited in claim 16, wherein the parallel communications interface comprises a cross switch.

20. The system as recited in claim 16, wherein the serial communications interface and the parallel communications interface are formed on a single substrate with the backplane.

* * * * *